United States Patent
Sumioka

(10) Patent No.: US 10,831,205 B2
(45) Date of Patent: Nov. 10, 2020

(54) ROUTE DETERMINATION DEVICE, VEHICLE CONTROL DEVICE, ROUTE DETERMINATION METHOD, AND STORAGE MEDIUM

(71) Applicant: HONDA MOTOR CO., LTD., Minato-ku, Tokyo (JP)

(72) Inventor: Tadashi Sumioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 15/907,337

(22) Filed: Feb. 28, 2018

(65) Prior Publication Data

US 2018/0267548 A1 Sep. 20, 2018

(30) Foreign Application Priority Data

Mar. 16, 2017 (JP) .................................. 2017-051779

(51) Int. Cl.

| G05D 1/02 | (2020.01) |
|---|---|
| G01C 21/34 | (2006.01) |
| G08G 1/16 | (2006.01) |
| B60W 30/09 | (2012.01) |
| G01C 21/36 | (2006.01) |

(52) U.S. Cl.
CPC .......... G05D 1/0214 (2013.01); B60W 30/09 (2013.01); G01C 21/3453 (2013.01); G08G 1/16 (2013.01); G08G 1/167 (2013.01); G01C 21/3492 (2013.01); G01C 21/3658 (2013.01)

(58) Field of Classification Search
CPC .... G05D 1/0214; G05D 1/0212; G08G 1/167; G08G 1/16; B60W 30/09; G01C 21/3453; G01C 21/3492; G01C 21/3658; G01C 21/3461
See application file for complete search history.

(56) References Cited

U.S. PATENT DOCUMENTS

2015/0345966 A1* 12/2015 Meuleau ............ G01C 21/3453
701/23
2019/0086226 A1* 3/2019 Hamada .................. G01C 21/34

FOREIGN PATENT DOCUMENTS

| JP | 5614055 | 10/2014 | |
|---|---|---|---|
| WO | WO-2017168662 A1 * | 10/2017 | ............. G01C 21/34 |

* cited by examiner

*Primary Examiner* — Tuan C To
*Assistant Examiner* — Kelly D Williams
(74) *Attorney, Agent, or Firm* — Amin, Turocy & Watson, LLP

(57) ABSTRACT

Provided is a route determination device including a recognition unit that recognizes peripheral circumstances of a host vehicle (121); and an evaluation unit (123C) that evaluates each of a plurality of routes based on a sum of costs respectively applied to a plurality of edges based on peripheral circumstances of the host vehicle recognized by the recognition unit, and selects one or more routes from the plurality of routes based on an evaluation result. Each of the plurality of routes is generated by joining at least two of a plurality of edges. Each of the plurality of edges is generated by connecting two virtual nodes among a plurality of virtual nodes. The plurality of virtual nodes is located with space in each of a forward moving direction and a road width direction.

16 Claims, 26 Drawing Sheets

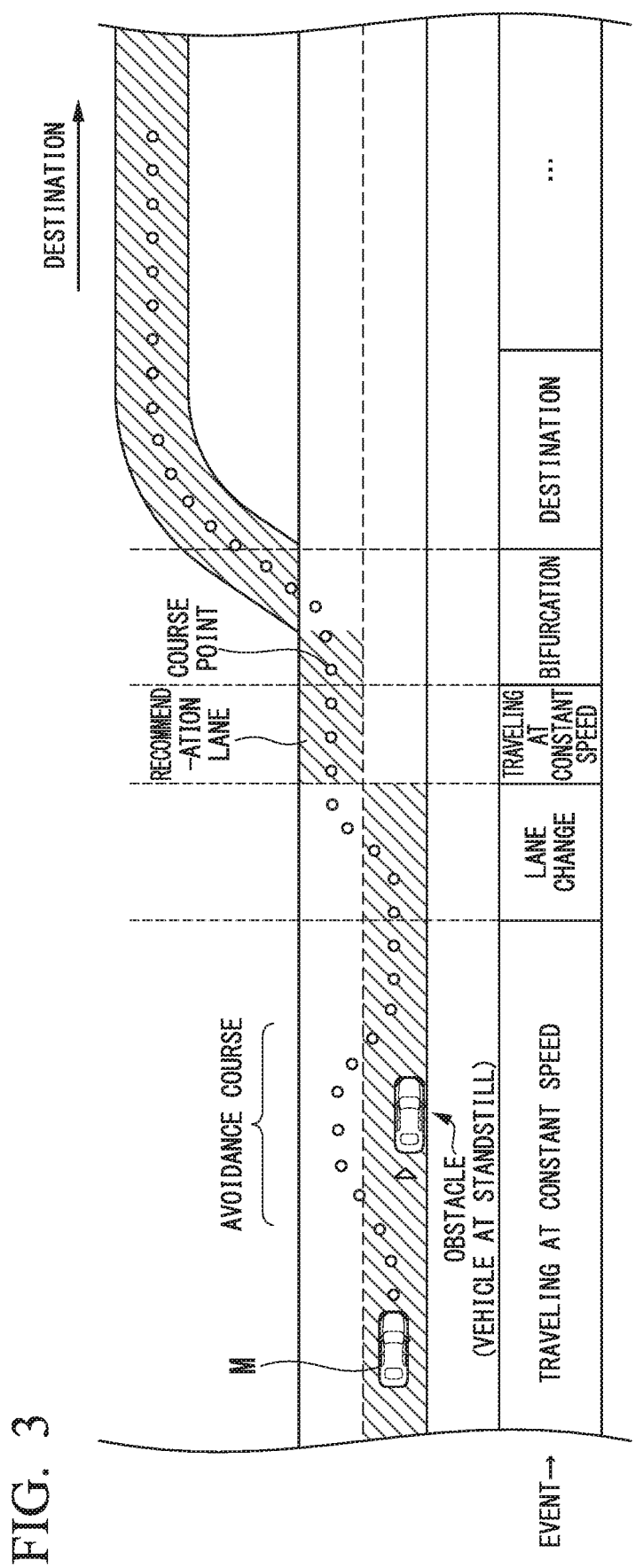

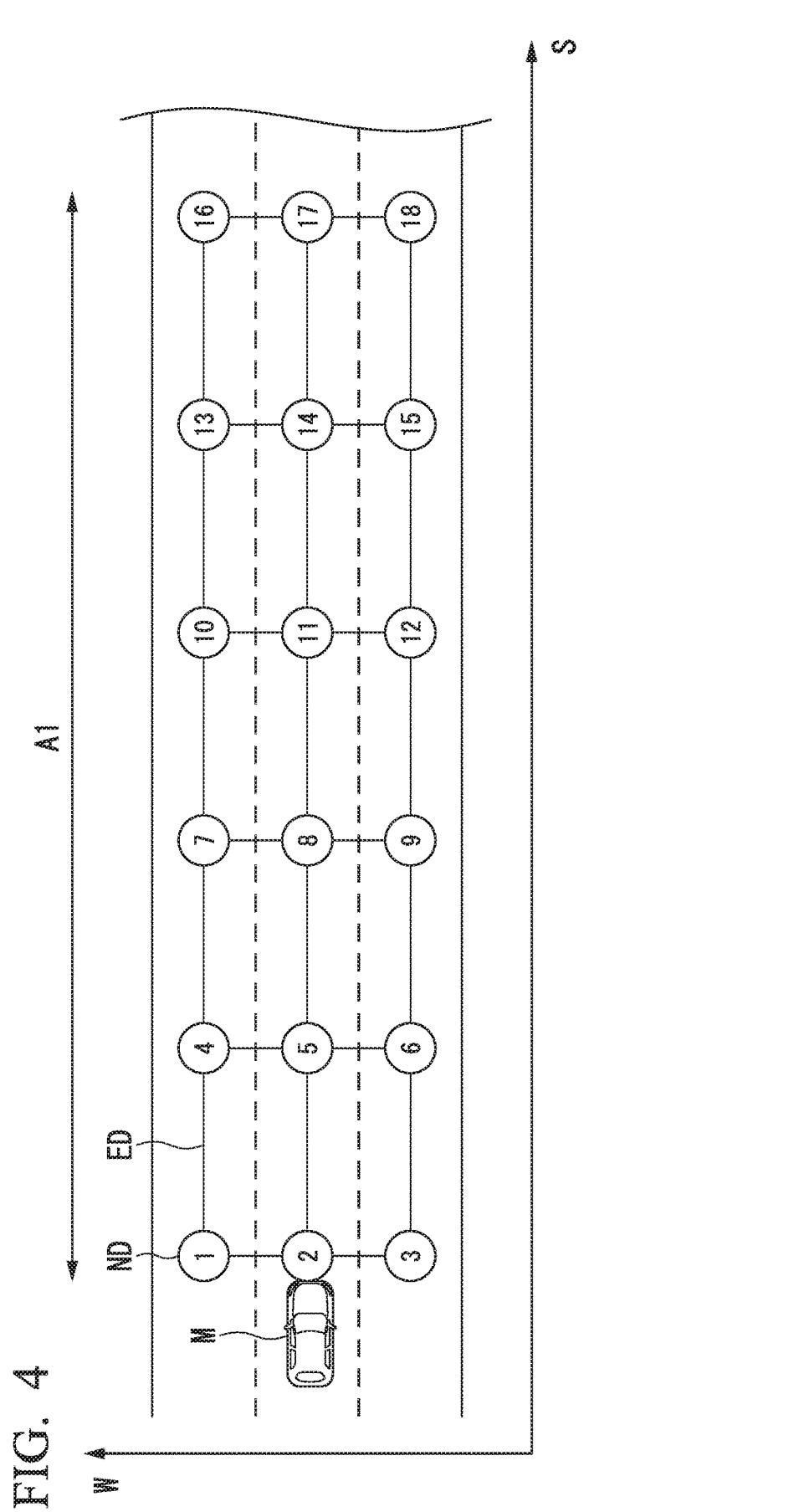

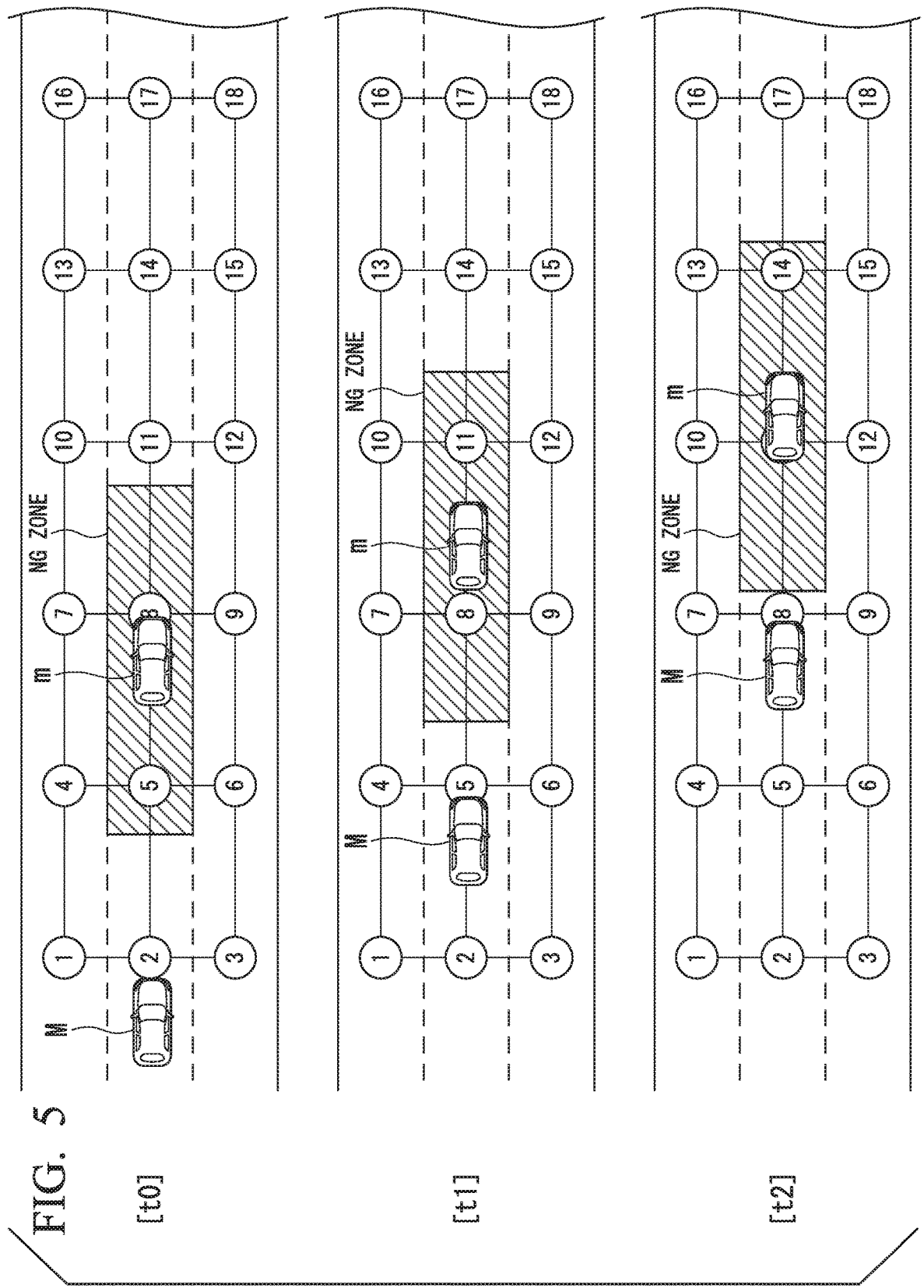

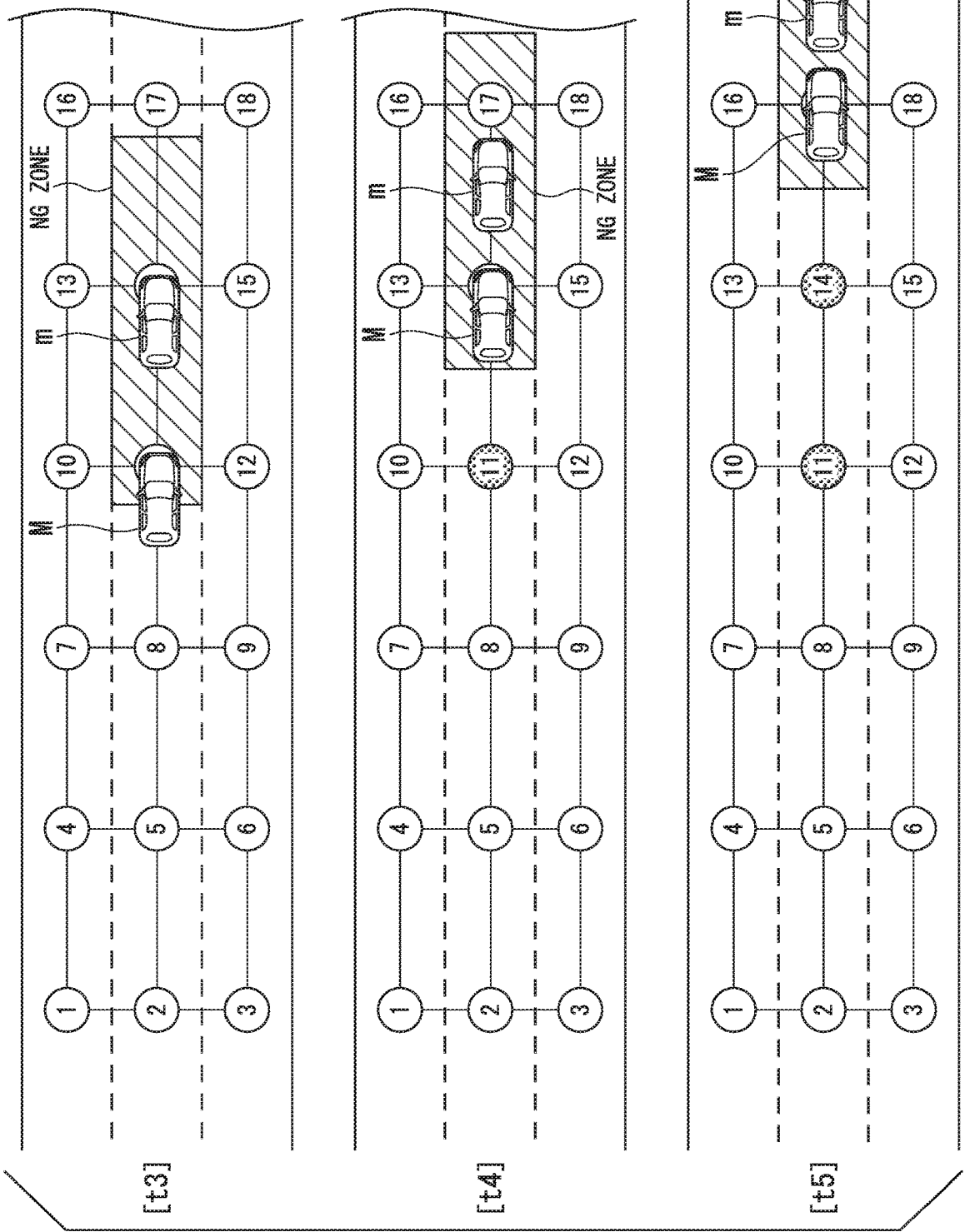

FIG. 7

|    | 1   | 2   | 3   | 4   | 5   | 6   | 7   | 8   | 9   | 10  | 11  | 12  | 13  | 14  | 15  | 16  | 17  | 18  |
|----|-----|-----|-----|-----|-----|-----|-----|-----|-----|-----|-----|-----|-----|-----|-----|-----|-----|-----|
| 1  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 2  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 3  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 4  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 5  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 6  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 7  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 8  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 9  | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 10 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 11 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 12 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 13 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 14 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 15 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 16 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 17 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |
| 18 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 | 1e5 |

ROUTE DETERMINATION DEVICE, VEHICLE CONTROL DEVICE, ROUTE DETERMINATION METHOD, AND STORAGE MEDIUM

BACKGROUND OF THE INVENTION

Field of the Invention

The present invention relates to a route determination device, a vehicle control device, a route determination method, and a storage medium.

Description of Related Art

In the related art, Japanese Patent No. 5614055 discloses a driving support device which estimates a future moving state of a moving body on the periphery of a host vehicle and performs driving support based on the future moving state. The device includes moving state acquiring means for acquiring a current moving state of a moving body, and moving state estimating means for estimating a presence probability distribution of the moving body after a predetermined time based on a current moving state of the moving body acquired by the moving state acquiring means. The device individually calculates presence probability of an obstacle and presence probability of the host vehicle with respect to areas demarcated on a grid, and ultimately performs control including automated steering.

SUMMARY OF THE INVENTION

According to the technology in the related art, there may be cases in which a computation load is high and a real-time response cannot be performed in a traveling situation of a vehicle. Since movement of a peripheral object in a traveling situation of a vehicle changes from moment to moment, it is sometimes desirable to primarily perform a calculation on a broad scale.

The present invention has been made in consideration of such circumstances, and an object thereof is to provide a route determination device which is able to determine a route more quickly and appropriately, a vehicle control device, a route determination method, and a storage medium.

A vehicle control system, a vehicle control method, and a storage medium according to the invention employ the following configurations.

(1): There is provided a route determination device including a recognition unit that recognizes peripheral circumstances of a host vehicle, and an evaluation unit that evaluates each of a plurality of routes based on a sum of costs respectively applied to a plurality of edges based on the peripheral circumstances of the host vehicle recognized by the recognition unit, and selects one or more routes from the plurality of routes based on an evaluation result. Each of the plurality of routes is generated by joining at least two of a plurality of edges. Each of the plurality of edges is generated by connecting two virtual nodes among a plurality of virtual nodes. The plurality of virtual nodes is located with space in each of a forward moving direction and a road width direction.

(2): In (1), the recognition unit recognizes a position and a state of an object on the periphery of the host vehicle. The route determination device further includes an estimation unit that estimates a future position of the object based on a position and a state of the object recognized by the recognition unit. The evaluation unit applies a cost to each of the plurality of edges based on a future position of the object estimated by the estimation unit.

(3): In (1), the plurality of nodes are located for each lane in the road width direction.

(4): In (1), the evaluation unit individually evaluates one or more routes in which the host vehicle is able to arrive at an target lane at a trailing end of an evaluation section in a case that the target lane at the trailing end of the evaluation section is set.

(5): In (1), the evaluation unit determines that the host vehicle is to travel while following a preceding vehicle in a case that a sum of the costs of all of the plurality of routes exceeds a criterion.

(6): In (1), the recognition unit recognizes a position of an object on the periphery of the host vehicle. The evaluation unit increases a cost to be applied to an edge corresponding to another lane on a side toward which the object is biased, in a case that the position of the object recognized by the recognition unit is biased from a center of a lane.

(7): In (1), the recognition unit recognizes a position and a size of an object on the periphery of the host vehicle. The evaluation unit increases a cost to be applied to an edge on the periphery of the object in a case that the object recognized by the recognition unit is large in size.

(8): In (1), the recognition unit recognizes a direction in which an object on the periphery of the host vehicle moves. The evaluation unit determines a cost to be applied to an edge on the periphery of the object, based on the direction recognized by the recognition unit.

(9): There is provided a vehicle control device including the invention of (1), and a driving control unit that controls the host vehicle to move based on a route selected by the evaluation unit of the route determination device.

(10): There is provided a route determination method using a computer mounted in a host vehicle, comprising: recognizing peripheral circumstances of the host vehicle, evaluating each of a plurality of routes based on a sum of costs respectively applied to a plurality of edges based on peripheral circumstances of the host vehicle recognized by the recognition unit, and selecting one or more routes from the plurality of routes based on an evaluation result. Each of the plurality of routes is generated by joining at least two of a plurality of edges. Each of the plurality of edges is generated by connecting two virtual nodes among a plurality of virtual nodes. The plurality of virtual nodes is located with space in each of a forward moving direction and a road width direction.

(11): There is provided a non-transitory computer-readable storage medium which stores a program for causing a computer mounted in a host vehicle to recognize peripheral circumstances of the host vehicle, to evaluate each of a plurality of routes based on a sum of costs respectively applied to a plurality of edges based on the peripheral circumstances of the host vehicle recognized by the recognition unit, and to select one or more routes from the plurality of routes based on an evaluation result. Each of the plurality of routes is generated by joining at least two of a plurality of edges. Each of the plurality of edges is generated by connecting two virtual nodes among a plurality of virtual nodes. The plurality of virtual nodes is located with space in each of a forward moving direction and a road width direction.

According to the aspects of the invention, it is possible to determine a route more quickly and appropriately.

BRIEF DESCRIPTION OF THE DRAWINGS

FIG. 3 is a view illustrating a state in which an target course is generated based on a recommendation lane.

FIG. 4 is a view for describing nodes and edges.

FIG. 5 is a view for describing a technique of setting NG nodes (phase 1).

FIG. 6 is a view for describing the technique of setting NG nodes (phase 2).

FIG. 7 is a view illustrating an initial state of an edge cost table.

FIG. 8 is a view illustrating a state of a second stage of the edge cost table.

FIG. 9 is a view illustrating a state of a third stage of the edge cost table.

FIG. 10 is a view illustrating a state of a fourth stage of the edge cost table.

DETAILED DESCRIPTION OF THE INVENTION

Hereinafter, an embodiment of a route determination device, a vehicle control device, a route determination method, and a storage medium according to the present invention will be described with reference to the drawings.

[Overall Configuration]

Figure 1:
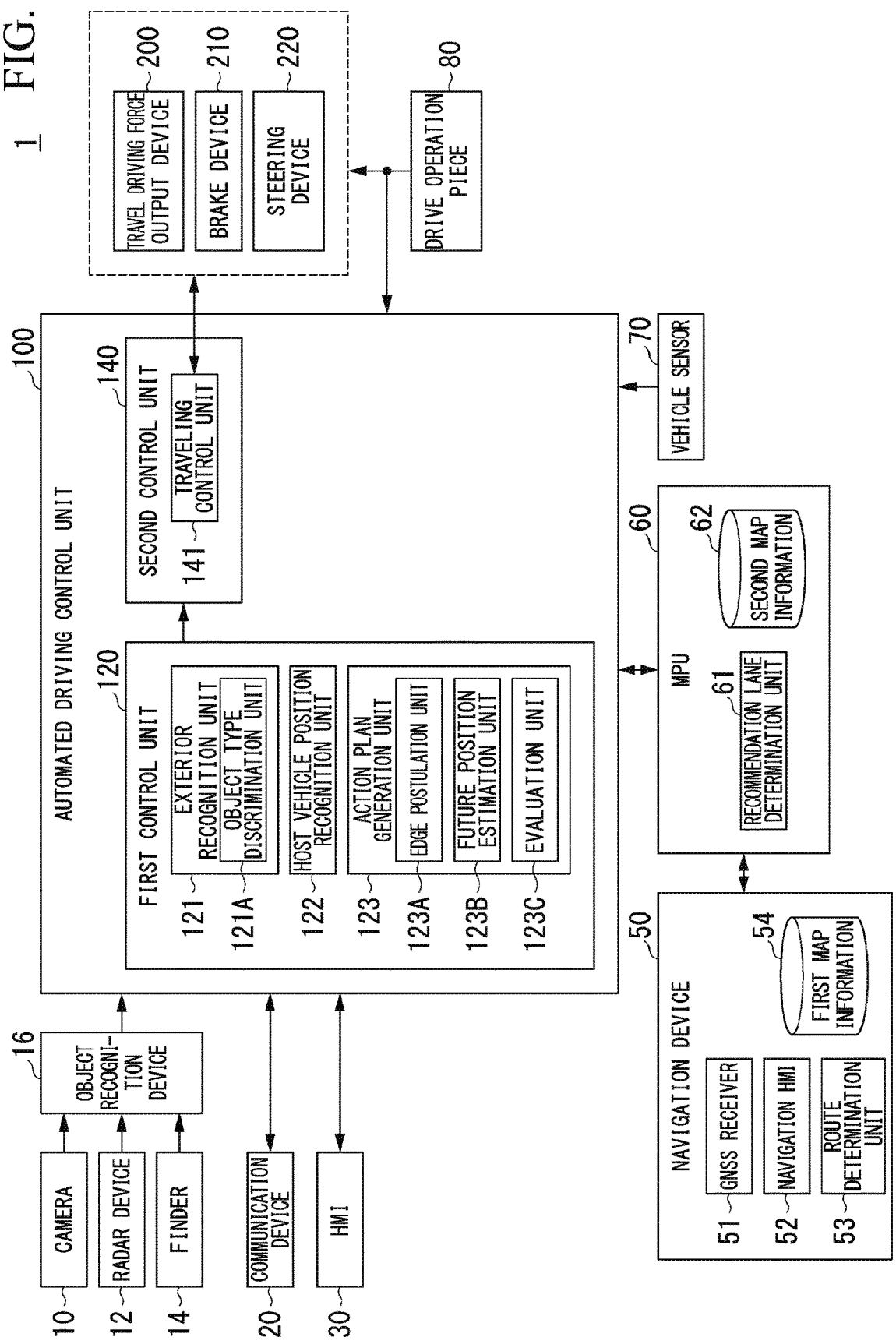
FIG. 1 is a view of a configuration of a vehicle system utilizing a route determination device according to an embodiment.

A configuration of the present embodiment in which a route determination device is applied to an automated drive vehicle will be described. FIG. 1 is a view of a configuration of a vehicle system 1 utilizing a route determination device according to the embodiment. The vehicle system 1 is mounted in a vehicle, for example, a vehicle having two wheels, three wheels, four wheels, or the like. A driving source thereof is an internal combustion engine such as a diesel engine or a gasoline engine, an electric motor, or a combination of those. The electric motor operates using electric power generated by an electric dynamo interlocked with the internal combustion engine or electric power discharged by a secondary cell or a fuel cell.

For example, the vehicle system 1 includes a camera 10, a radar device 12, a finder 14, an object recognition device 16, a communication device 20, a human machine interface (HMI) 30, a navigation device 50, a micro-processing unit (MPU) 60, a vehicle sensor 70, a drive operation piece 80, an automated drive control unit 100, a traveling driving force output device 200, a brake device 210, and a steering device 220. The devices and instruments are connected to one another through a multiplex communication line such as a controller area network (CAN) communication line, a serial communication line, a radio communication network, or the like. The configuration illustrated in FIG. 1 is merely an example, and parts of the configuration may be omitted, or other configurations may be added.

For example, the camera 10 is a digital camera utilizing a solid-state image sensing device such as a charge coupled device (CCD) or a complementary metal oxide semiconductor (CMOS). One or a plurality of cameras 10 are attached in arbitrary locations in a vehicle (which will hereinafter be referred to as a host vehicle M) in which the vehicle system 1 is mounted. In a case of capturing an image of an area ahead, the camera 10 is attached to an upper portion of a front windshield, the rear surface of a rearview mirror, or the like. For example, the camera 10 captures an image of the surroundings of the host vehicle M periodically and repetitively. The camera 10 may be a stereo camera.

The radar device 12 detects at least the position (distance and azimuth) of an object by emitting radio waves such as millimeter waves on the periphery of the host vehicle M and detecting the radio waves (reflected waves) reflected by the object. One or a plurality of radar devices 12 are attached in arbitrary locations in the host vehicle M. The radar device 12 may detect the position and the speed of an object by a frequency modulated continuous wave (FM-CW) method.

The finder 14 is light detection and ranging or laser imaging detection and ranging (LIDAR) measuring scattered light with respect to irradiation light and detecting the distance to a target. One or a plurality of finders 14 are attached in arbitrary locations in the host vehicle M.

The object recognition device 16 performs sensor fusion processing with respect to a part or all detection results of the camera 10, the radar device 12, and the finder 14, thereby recognizing the position, the type, the speed, and the like of an object. The object recognition device 16 outputs a recognition result to the automated drive control unit 100.

The communication device 20 communicates with a different vehicle present on the periphery of the host vehicle M utilizing, for example, a cellular network, a Wi-Fi network, Bluetooth (registered trademark), or a dedicated short range communication (DSRC) or communicates with various server devices via a radio base station.

The HMI 30 presents various types of information to an occupant of the host vehicle M and receives an input operation of the occupant. The HMI 30 includes various display devices, a speaker, a buzzer, a touch panel, a switch, keys and the like.

For example, the navigation device 50 includes a global navigation satellite system (GNSS) receiver 51, a navigation HMI 52, and a route determination unit 53 and retains first map information 54 in a storage device such as a hard disk drive (HDD) or a flash memory. The GNSS receiver specifies the position of the host vehicle M based on a signal received from a GNSS satellite. The position of the host vehicle M may be specified or complemented by an inertial navigation system (INS) utilizing an output of the vehicle sensor 70. The navigation HMI 52 includes a display device, a speaker, a touch panel, keys, and the like. A part or all of the navigation HMI 52 may be shared by the HMI 30 described above. For example, with reference to the first map information 54, the route determination unit 53 determines a route (hereinafter, a route on a map) to a destination input by an occupant using the navigation HMI 52, from the position of the host vehicle M (or an input arbitrary position) specified by the GNSS receiver 51. For example, the first map information 54 is information in which a road shape is expressed with links indicating a road, and nodes connected by the links. The first map information 54 may include curvatures, point of interest (POI) information, and the like of a road. A route on a map determined by the route determination unit 53 is output to the MPU 60. The navigation device 50 may perform route guidance using the navigation HMI 52 based on a route on a map determined by the route determination unit 53. For example, the navigation device 50 may be generated by a function of a terminal device such as a smart phone or a tablet terminal possessed by a user. The navigation device 50 may transmit a current position and a destination to a navigation server via the communication device 20 and may acquire a route on a map sent back from the navigation server.

For example, the MPU 60 functions as a recommendation lane determination unit 61 and retains second map information 62 in the storage device such as an HDD or a flash memory. The recommendation lane determination unit 61 divides a route provided from the navigation device 50 into a plurality of blocks (for example, divides a route every 100 m related to a forward moving direction of a vehicle) and determines a recommendation lane for each block with reference to the second map information 62. The recommendation lane determination unit 61 makes a determination, such as in which lane from the left to travel. When a bifurcated location, a merging location, or the like is present in a route, the recommendation lane determination unit 61 determines a recommendation lane such that the host vehicle M can travel along a reasonable route to move ahead of the bifurcation.

The second map information 62 is highly precise map information compared to the first map information 54. For example, the second map information 62 includes information of the center of a lane, information of the demarcation of a lane, and the like. The second map information 62 may include road information, traffic regulation information, address information (address and zip code), facility information, telephone number information, and the like. The road information includes information indicating the type of a road such as an expressway, a toll road, a national highway, and a local road; and information such as the number of lanes of the road, the width of each lane, the gradient of the road, the position (three-dimensional coordinates including the longitude, the latitude, and the height) of the road, the curvature of lane curves, the positions of merging and the bifurcation points of the lanes, signs provided on roads, and the like. The second map information 62 may be updated any time through access to a different device using the communication device 20.

The vehicle sensor 70 includes a vehicle speed sensor detecting the speed of the host vehicle M, an acceleration sensor detecting acceleration, a yaw rate sensor detecting an angular speed around a vertical axis, an azimuth sensor detecting the direction of the host vehicle M, and the like.

For example, the drive operation piece 80 includes an accelerator pedal, a brake pedal, a shift lever, a steering wheel, and other operation pieces. A sensor detecting an operation amount or the presence or absence of an operation is attached to the drive operation piece 80, and the detection result thereof is output to one or both of the automated drive control unit 100; and the traveling driving force output device 200, the brake device 210, and the steering device 220.

For example, the automated drive control unit 100 includes a first control unit 120 and a second control unit 140. Each of the first control unit 120 and the second control unit 140 is realized when a processor such as a central processing unit (CPU) executes a program (software). The program may be stored in a storage device such as a hard disk drive (HDD) or a flash memory in advance. The program may be stored in an attachable/detachable storage medium such as a DVD or a CD-ROM and may be installed in the storage device when a drive device is equipped with the storage medium. A part or all functional portions of the first control unit 120 and the second control unit 140 may be realized by hardware (circuit section; including circuitry) such as a large scale integration (LSI), an application specific integrated circuit (ASIC), and a field-programmable gate array (FPGA) or may be realized by software and hardware in cooperation. The automated drive control unit 100 is an example of the "vehicle control device".

For example, the first control unit 120 includes an exterior recognition unit 121, a host vehicle position recognition unit 122, and an action plan generation unit 123. The exterior recognition unit 121 includes an object type discrimination unit 121A. The action plan generation unit 123 includes an edge postulation unit 123A, a future position estimation unit 123B, and an evaluation unit 123C. A combination of the object type discrimination unit 121A, the edge postulation unit 123A, the future position estimation unit 123B, and the evaluation unit 123C is an example of the route determination device.

The exterior recognition unit 121 recognizes the state (the position, the speed, the acceleration, and the like) of an object on the periphery of the host vehicle M based on information input via the object recognition device 16 from the camera 10, the radar device 12, and the finder 14. The position of an object may be indicated with a representative point, such as the center of gravity or the corner of the object. The position of an object may be indicated with an expressed region. The "state" of an object may include acceleration or jerk of an object, or an "action state" (for example, whether or not an object is making or intends to make a lane change).

The object type discrimination unit 121A of the exterior recognition unit 121 discriminates the type of an object (a heavy vehicle, a general vehicle, a truck, a two-wheeled vehicle, a pedestrian, a guardrail, a utility pole, a parked vehicle, or the like). For example, the object type discrimination unit 121A discriminates the type of an object based on the size or the shape of the object in an image captured by the camera 10, received intensity of the radar device 12, and other information.

For example, the host vehicle position recognition unit 122 recognizes the lane (traveling lane) in which the host vehicle M is traveling, and the relative position and posture of the host vehicle M with respect to the traveling lane. For example, the host vehicle position recognition unit 122 recognizes a traveling lane by comparing the pattern (for example, a layout of solid lines and dotted lines) of road demarcation lines obtained from the second map information 62, and the pattern of road demarcation lines on the periphery of the host vehicle M recognized from an image captured by the camera 10. The position of the host vehicle M acquired from the navigation device 50 or a processing result of the INS may be added to this recognition.

Figure 2:
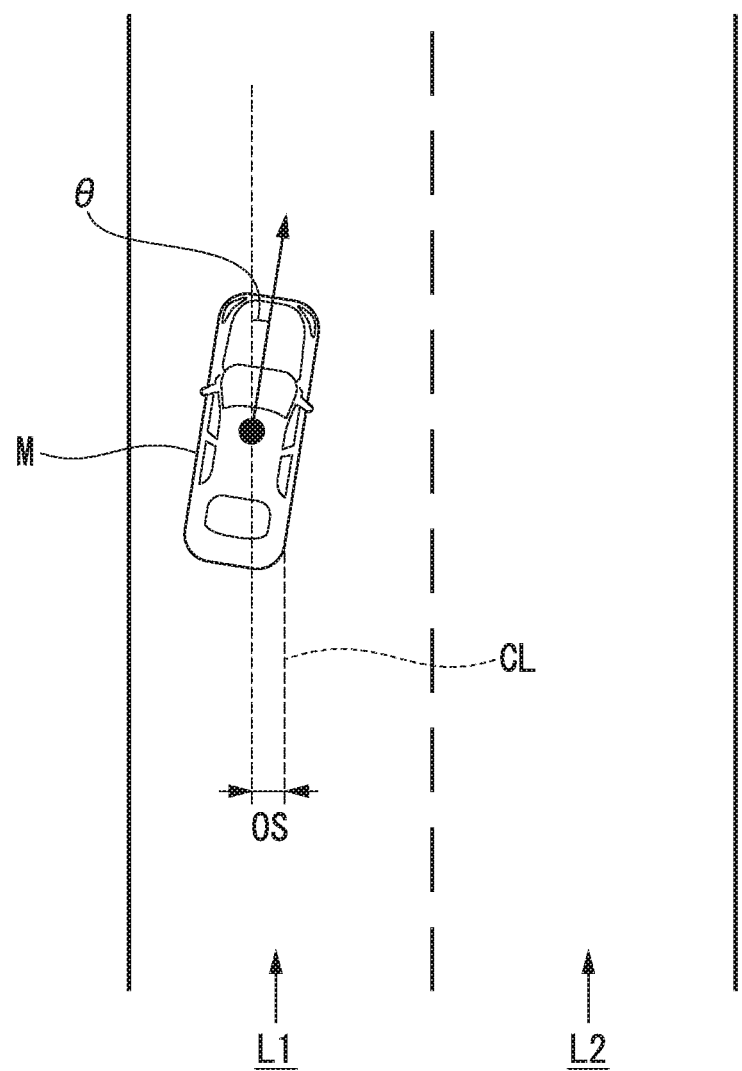
FIG. 2 is a view illustrating a state in which a host vehicle position recognition unit recognizes relative position and posture of a host vehicle with respect to a traveling lane.

For example, the host vehicle position recognition unit 122 recognizes the position or the posture of the host vehicle M with respect to the traveling lane. FIG. 2 is a view illustrating a state in which the host vehicle position recognition unit 122 recognizes relative position and posture of the host vehicle M with respect to a traveling lane L1. For example, the host vehicle position recognition unit 122 recognizes an estrangement OS from a center CL of a traveling lane of a reference point (for example, the center of gravity) of the host vehicle M, and an angle θ of a line generated by joining the reference points of the host vehicle M in the forward moving direction with respect to the center CL of the traveling lane, as the relative position and posture of the host vehicle M with respect to the traveling lane L1. In place thereof, the host vehicle position recognition unit 122 may recognize the position of the reference point of the host vehicle M, and the like with respect to any of side end portions of the traveling lane L1, as a relative position of the host vehicle M with respect to the traveling lane. The relative position of the host vehicle M recognized by the host vehicle position recognition unit 122 is provided to the recommendation lane determination unit 61 and the action plan generation unit 123.

The action plan generation unit 123 determines events which are sequentially executed in automated driving, such that the host vehicle M travels in a recommendation lane determined by the recommendation lane determination unit 61 and can cope with peripheral circumstances of the host vehicle M. Examples of the events include a constant-speed traveling event of traveling in the same traveling lane at a constant speed, a following traveling event of following a preceding vehicle, a passing event of passing a preceding vehicle, an avoiding event of avoiding an obstacle, a lane-change event, a merging event, a bifurcating event, an emergency stopping event, and a handover event of ending automated driving and switching over to manual driving. Sometimes action for avoidance is planned based on peripheral circumstances of the host vehicle M (the presence of a peripheral vehicle or a pedestrian, a lane narrowed due to road work, and the like) while the events are executed.

The action plan generation unit 123 generates an target course in which the host vehicle M will travel in the future, by means of functions of the edge postulation unit 123A, the future position estimation unit 123B, and the evaluation unit 123C. Each of the functional portions will be described below in detail. For example, an target course includes a speed factor. For example, an target course is expressed as a course generated by sequentially arranging spots (course points) at which the host vehicle M ought to arrive. The course point is a spot which is provided every predetermined traveling distance and at which the host vehicle M ought to arrive. Apart from that, an target speed and target acceleration for each predetermined sampling time (for example, approximately several tenths of a second) are generated as a part of an target course. The course point may be a position at which the host vehicle M ought to arrive at the sampling time thereof for each predetermined sampling time. In this case, information of the target speed or the target acceleration is expressed at intervals of the course points.

FIG. 3 is a view illustrating a state in which an target course is generated based on a recommendation lane. As illustrated, the recommendation lane is set to conveniently travel along a route to a destination. When the host vehicle M comes near to a switching spot of the recommendation lane at a predetermined distance (which may be determined in accordance with the type of event), the action plan generation unit 123 starts a lane-change event, a bifurcating event, a merging event, or the like. When there is a need to avoid an obstacle while each of the events is executed, an avoidance course is generated as illustrated.

The second control unit 140 includes a traveling control unit 141. The traveling control unit 141 controls the traveling driving force output device 200, the brake device 210, and the steering device 220 such that the host vehicle M passes through an target course generated by the action plan generation unit 123, at a scheduled time.

The traveling driving force output device 200 outputs a traveling driving force (torque) to driving wheels such that a vehicle travels. For example, the traveling driving force output device 200 includes a combination of an internal combustion engine, an electric motor, and a gearbox, and an ECU which controls these. The ECU controls the configuration described above in accordance with information input from the traveling control unit 141 or information input from the drive operation piece 80.

For example, the brake device 210 includes a brake caliper, a cylinder which transfers a hydraulic pressure to the brake caliper, an electric motor which generates a hydraulic pressure in the cylinder, and a brake ECU. The brake ECU controls the electric motor in accordance with information input from the traveling control unit 141 or information input from the drive operation piece 80 such that a brake torque in response to a braking operation is output to each of wheels. The brake device 210 may include, as a back-up, a mechanism for transferring a hydraulic pressure, which is generated by operating the brake pedal included in the drive operation piece 80, to the cylinder via a master cylinder. The brake device 210 is not limited to the configuration described above and may be an electronic control hydraulic brake device which controls an actuator in accordance with information input from the traveling control unit 141 and transfers a hydraulic pressure of the master cylinder to the cylinder.

For example, the steering device 220 includes a steering ECU and an electric motor. For example, the electric motor causes a force to act on a rack-and-pinion mechanism and changes the direction of turning wheels. The steering ECU drives the electric motor in accordance with information input from the traveling control unit 141 or information input from the drive operation piece 80 and changes the direction of the turning wheels.

[Course Determination Based on Route Analysis]

Hereinafter, an example of a technique of generating an target course using the action plan generation unit 123 will be described. For example, the technique described below is executed when events which are a part of the various events described above have started.

(Node and Edge)

FIG. 4 is a view for describing nodes and edges. First, the edge postulation unit 123A of the action plan generation unit 123 postulates (sets) a plurality of virtual nodes ND with space in each of a forward moving direction S and a road width direction W in a road surface region within a target lane in a section (hereinafter, an evaluation section) A1 which becomes a processing target on a side in the forward moving direction of the host vehicle M. Moreover, the edge postulation unit 123A postulates (sets) edges ED each generated by connecting two nodes ND among the plurality of nodes ND. For example, the expression "postulate" denotes setting of coordinate information of the nodes ND and the edges ED to a memory such as a RAM. For example, in computer processing, the nodes ND are indicated in xy coordinates, and the edges ED are indicated in xy coordinates or identification information of nodes on both ends. The evaluation section A1 is a section having a size suitable for controlling a vehicle.

For example, the edge postulation unit 123A postulates a plurality of nodes ND for each predetermined distance related to the forward moving direction S of the host vehicle M. On the other hand, the edge postulation unit 123A postulates a plurality of nodes ND for each distance at which the host vehicle M arrives for each predetermined time, related to the forward moving direction S of the host vehicle M. For example, the edge postulation unit 123A postulates each of a plurality of nodes ND for each lane such that the plurality of nodes ND are positioned at the center of the lane, related to the road width direction W. In the description below, sometimes a node ND marked with circled number 1 in FIG. 4 will be expressed as a node (1), and an edge ED connecting the node (1) and a node (4) will be expressed as an edge (1, 4).

The edge ED may be set between only two adjacent nodes ND related to the forward moving direction S or the road width direction W or may be set between two arbitrary nodes ND selected from all of the nodes ND. In the latter case, an edge between two nodes ND which are not adjacent to each other is excluded from a plurality of edges configuring a route, by sufficiently increasing a cost (described below). In description below, the technique of the latter case will be employed. FIG. 4 illustrates a straight road for simplifying the description. However, in regard to a curve as well, similar processing can be performed via some transform processing.

The future position estimation unit 123B estimates a future position of an object (particularly, a peripheral vehicle) recognized by the exterior recognition unit 121. For example, the future position estimation unit 123B estimates a future position of an object, assuming that the object performs a uniform speed motion. In place thereof, the future position estimation unit 123B may estimate a future position of an object, assuming that the object performs a uniform acceleration motion and a uniform jerk motion. For example, the future position estimation unit 123B estimates a future position of an object in regard to future timing for each predetermined time or each movement of the host vehicle M corresponding to one node ND in the forward moving direction S. A time required when the host vehicle M moves as much as one grid in the forward moving direction S in an target course candidate depends on a future speed change of the host vehicle M. However, for example, the future position estimation unit 123B sets future timing, assuming that the host vehicle M makes arbitrary motions which can be estimated, such as a uniform speed motion, a uniform acceleration motion, a uniform jerk motion, and a motion based on an estimated motion model calculated from a probability statistic model.

The evaluation unit 123C evaluates a plurality of routes. Each of the plurality of routes is generated by joining a plurality of edges ED. For example, the evaluation unit 123C evaluates all of the routes which can be generated with combinations of the plurality of edges ED. For example, in the example of FIG. 4, the current position of the host vehicle M corresponds to a node (2).

When no target lane is designated at a trailing end of the evaluation section A1 in advance, all of a node (16), a node (17), and a node (18) can be final nodes ND (which will hereinafter be referred to as trailing end nodes). In this case, the evaluation unit 123C postulates a combination of all of the edges ED from the node (2) to the node (16), a combination of all of the edges ED from the node (2) to the node (17), and a combination of all of the edges ED from the node (2) to the node (18) and performs an evaluation based on the sum of costs for each edge ED in regard to all thereof. Examples of combinations of all of the edges ED from the node (2) to the node (16) include the edges (2, 1), (1, 4), (4, 7), (7, 10), (10, 13), and (13, 16), the edges (2, 5), (5, 8), (8, 7), (7-10), (10, 13), and (13, 16), and the like. Here, "a case in which no target lane is designated in advance" may include a case in which although the "recommendation lane" described above is determined, the host vehicle M does not necessarily need to travel in the recommendation lane during controlling. Hereinafter, this state will be sometimes referred to as "in free traveling".

Meanwhile, when an target lane is designated at the trailing end of the evaluation section A1 in advance, the evaluation unit 123C postulates a combination of all of the edges ED from the node (2) to a trailing end node corresponding to the target lane and performs an evaluation based on the sum of costs for each edge ED in regard to all thereof. For example, "a case in which an target lane is designated in advance" is a case in which the host vehicle M needs to exit a main line to a bifurcated road in order to be headed for a destination and travels while setting a lane on the bifurcated road side as an target lane. It may be considered as a case in which a bifurcating event or a lane-change event has started.

Here, when a route generated by joining edges ED, rules such as "consecutively selected edges ED are connected to each other by a node ND" and "there is no going back (for example, the host vehicle M does not move from a node (5) to the node (2) or does not move to the node (5) again after moving from the node (5) to the node (4)" are applied.

The evaluation unit 123C applies a cost to the edge ED based on a future position and the like of an object estimated by the future position estimation unit 123B based on the position of the object recognized by the exterior recognition unit 121. First, the evaluation unit 123C sets NG nodes in order to calculate the cost.

(Ng Node)

FIGS. 5 and 6 are views for describing a technique of setting NG nodes. In the description below, a "peripheral vehicle m" is described as a representative example of an "object". In the drawings, a time t0 is the point of time (initial point of time) at which a target demarcation is set. In regard to future times t1, t2, and so on, it is assumed that future positions of the host vehicle M and the peripheral vehicle m are estimated as described above. In regard to each of the times, an NG zone is set around the peripheral vehicle m. Means for setting an NG zone will be described below.

At the time t1, the representative point (for example, the central portion of a front end portion related to a vehicle width direction) of the host vehicle M has not entered the NG zone. Therefore, the node (5) closest to the position of the host vehicle M at the time t1 does not become an NG node.

At the time t2, the representative point of the host vehicle M has not entered the NG zone. Therefore, a node (8) closest to the position of the host vehicle M at the time t2 does not become an NG node.

At a time t3, the representative point of the host vehicle M has entered the NG zone. Therefore, a node (11) closest to the position of the host vehicle M at the time t3 becomes an NG node.

At a time t4, the representative point of the host vehicle M has entered the NG zone. Therefore, a node (14) closest to the position of the host vehicle M at the time t4 becomes an NG node.

At a time t5, the representative point of the host vehicle M has entered the NG zone. Therefore, the node (17) closest to the position of the host vehicle M at the time t5 becomes an NG node.

FIGS. 5 and 6 are described postulating that the host vehicle M travels in the same lane. However, while postulating that the host vehicle M makes a lane change, determination is similarly performed with respect to the peripheral vehicle m present in a lane to which the host vehicle M has made a lane change. That is, all of the nodes ND are each determined whether or not to be an NG node.

(Edge Cost Table)

The evaluation unit 123C applies a score to the edge ED by the technique described below. In order to describe the score applied to the edge ED, a concept of an edge cost table is introduced. The edge cost table may be ensured as a layout in a RAM or the like or may be retained as data in a different form (for example, in the form of a list). In the description below, for convenience, processing of updating the edge cost table in stages is described. However, the evaluation unit 123C need only perform processing similar thereto and may perform processing in any procedure.

FIG. 7 is a view illustrating an initial state of an edge cost table. The vertical and horizontal labels of the edge cost table indicate the numbers of the nodes ND. The unit of each item in the edge cost table is the distance indicated as "m", for example. First, the evaluation unit 123C sets sufficiently significant values for all combinations of edges ED. In the drawings, "e5" denotes "10 to fifth power".

Figure 8:
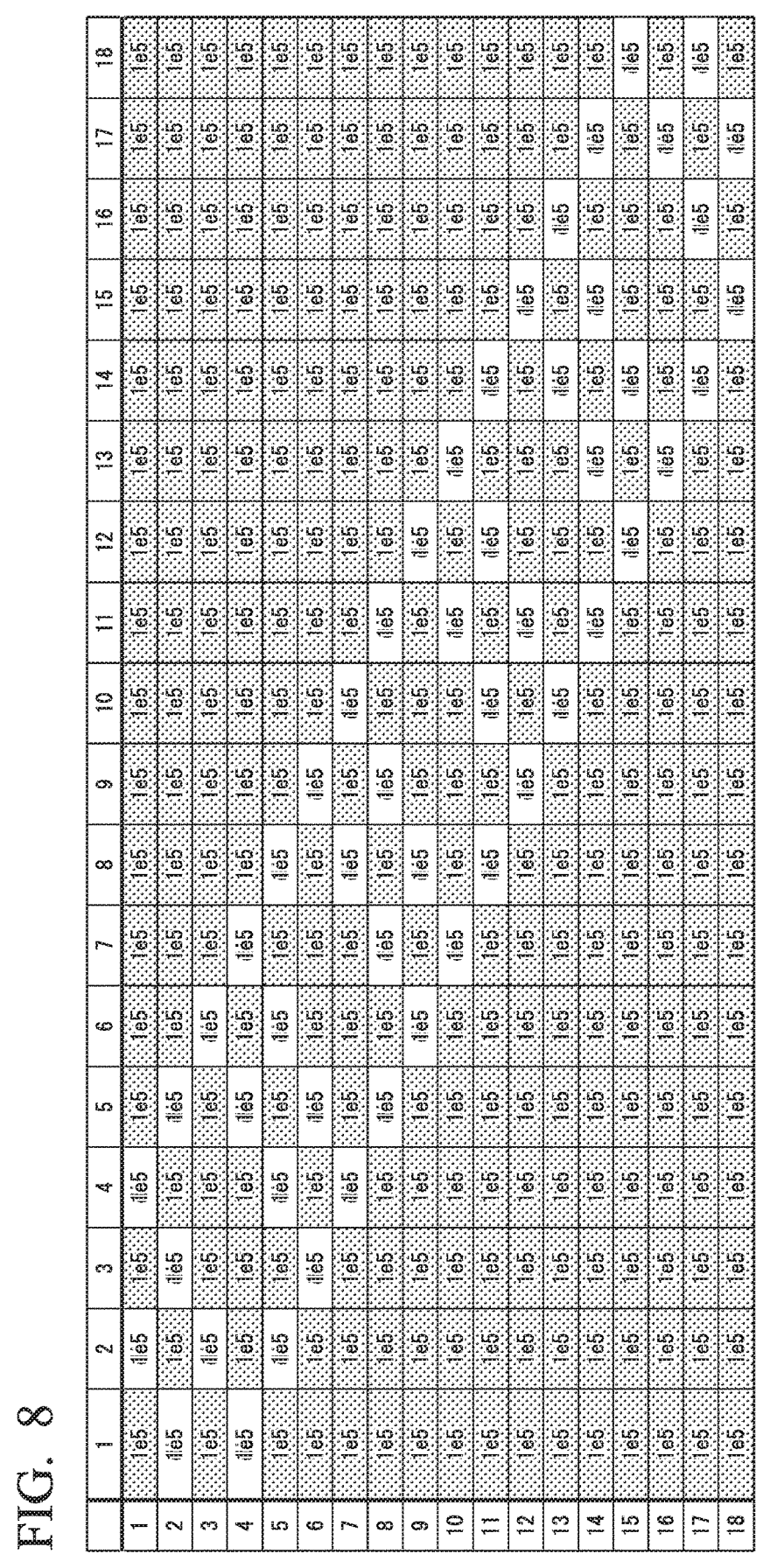

FIG. 8 is a view illustrating a state of a second stage of the edge cost table. The evaluation unit 123C sets a value (in the drawings, "dis") corresponding to the distance of the edge ED for the edge ED which connects the adjacent nodes ND in the forward moving direction S or the road width direction W.

Figure 9:
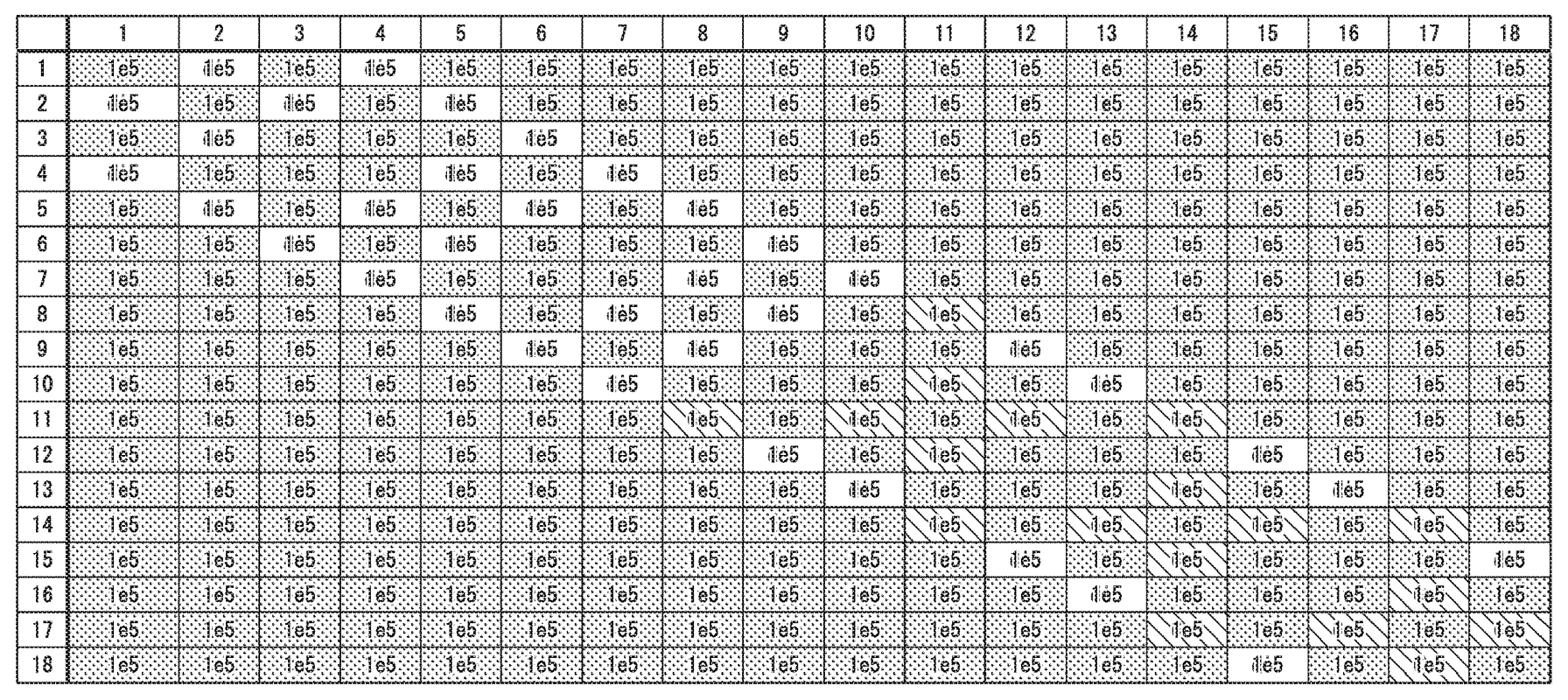

FIG. 9 is a view illustrating a state of a third stage of the edge cost table. The evaluation unit 123C sets a relatively significant cost for the edge ED connected to the NG node. In the example of FIGS. 5 and 6, the NG nodes are the nodes (11), (14), and (17). Therefore, a relatively significant cost is set for the edges (8, 11), (10, 11), and the like connected thereto. In the drawings, "e2" denotes "10 squared". Therefore, "6e2" corresponds to 600 m. For example, 600 m is a value close to the length of the evaluation section A1. Accordingly, it is possible to make the host vehicle M unlikely to enter the NG zone.

Figure 10:
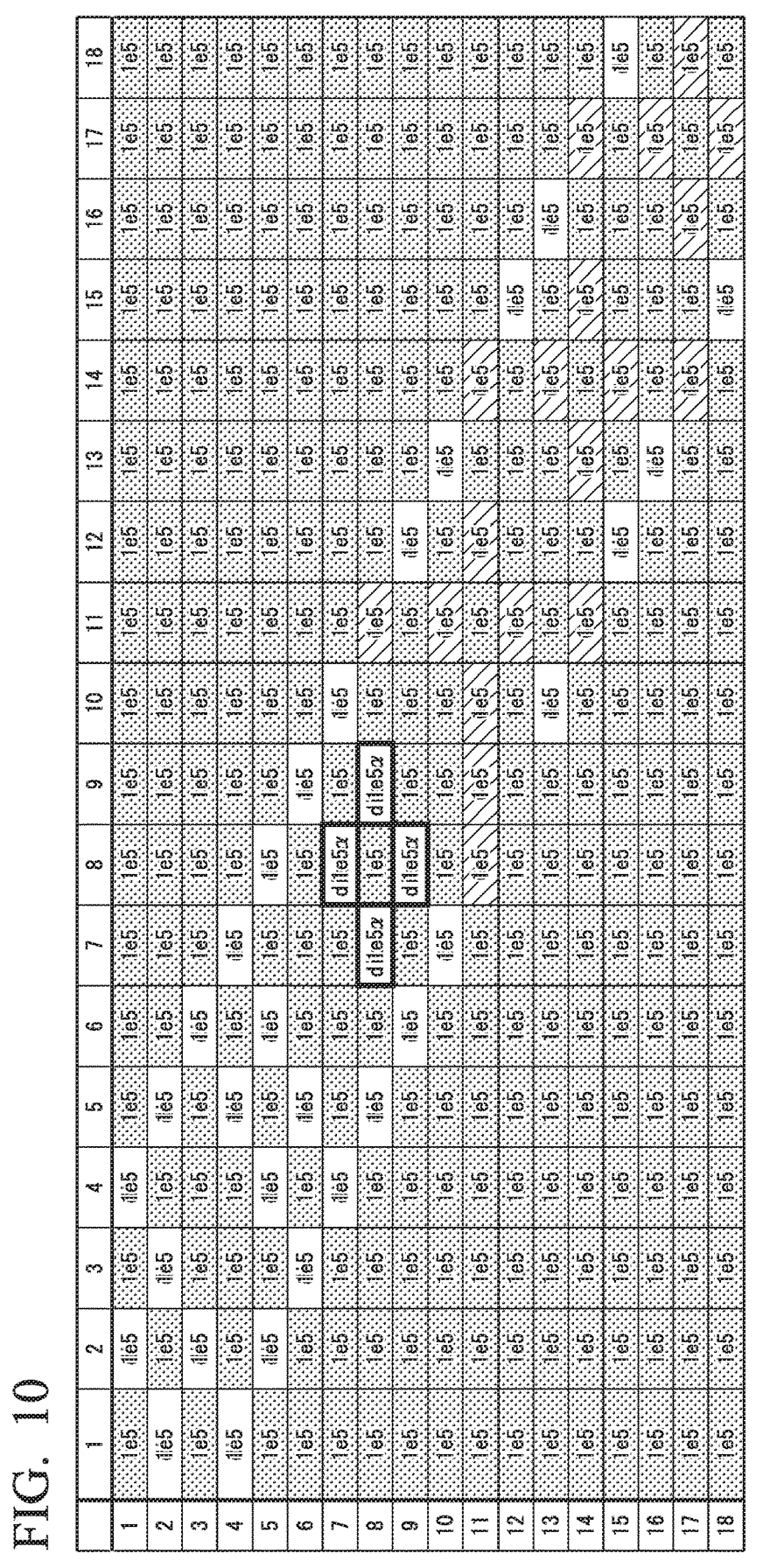

FIG. 10 is a view illustrating a state of a fourth stage of the edge cost table. The evaluation unit 123C sets a relatively small cost (for example, "dis-a (fixed value)") for the edge ED connected in the road width direction W with respect to the nodes ND adjacent to the NG nodes related to the forward moving direction S. Accordingly, the host vehicle M is able to easily travel while avoiding the NG nodes. In the example of FIGS. 5 and 6, since the nodes (11), (14), and (17) are the NG nodes, the node (8) adjacent to the node (11) related to the forward moving direction S corresponds thereto. In FIG. 10, relatively small costs are set for the edge (7, 8) and the edge (8, 9) connected in the road width direction W with respect to the node (8).

Summarizing the above, the size relationship of the cost set for the edge ED is indicated in the following order. The cost is not limited to the following four types and may be adjusted based on a bias or the like within a lane of the peripheral vehicle m as described below.

<<Significant>>

(A) The edge ED connecting two nodes ND which are not adjacent to each other (B) The edge ED connected to the NG node (C) The edge ED connecting two nodes ND which are adjacent to each other and not corresponding to (B) or (C).

(D) The edge ED connected in the road width direction W with respect to the nodes ND adjacent to the NG nodes related to the forward moving direction S.

<<Small>>

When a cost is set for the edge ED, the evaluation unit 123C selects a route in accordance with any of the followings. When being in free traveling, the evaluation unit 123C calculates (evaluates) the sum of the costs of the edges ED configuring a route for all of the routes from the node (2) to all of the nodes ND ((16), (17), and (18) in the example of FIG. 4) at the trailing end of the evaluation section A1. A route having the least total cost is determined as the route in which the host vehicle M ought to travel. However, when all of the calculated total costs are equal to or greater than a threshold value, the evaluation unit 123C determines that it is preferable to perform following traveling without performing passing or making a lane change.

Meanwhile, in a situation in which an target lane is designated in advance, the evaluation unit 123C calculates (evaluates) the sum of the costs of the edges ED configuring a route for all of the routes from the node (2) to the node ND (goal node) corresponding to an target lane at the trailing end of the evaluation section A1. A route having the least total cost is determined as the route in which the host vehicle M ought to travel. Similar to that described above, when all of the calculated total costs are equal to or greater than the threshold value, the evaluation unit 123C determines that it is preferable to perform following traveling without performing passing or making a lane change.

Figure 11:
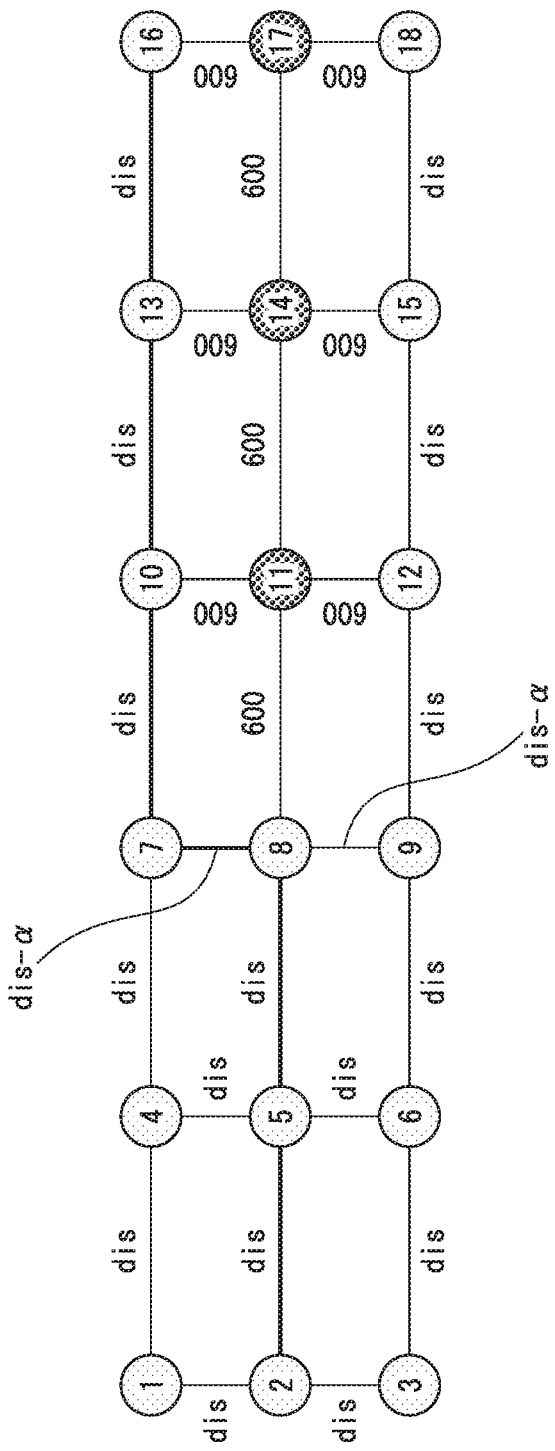
FIG. 11 is a view illustrating an example of a route determined when a goal node is set to (16).

FIG. 11 is a view illustrating an example of a route determined when a goal node is set to (16). As illustrated, the evaluation unit 123C makes a lane change from the node (8) before the node (11) (NG node) to the goal node side and selects the route (pass-through nodes are (2), (5), (8), (7), (10), (13), and (16)) of traveling straight forward without any change.

Figure 12:
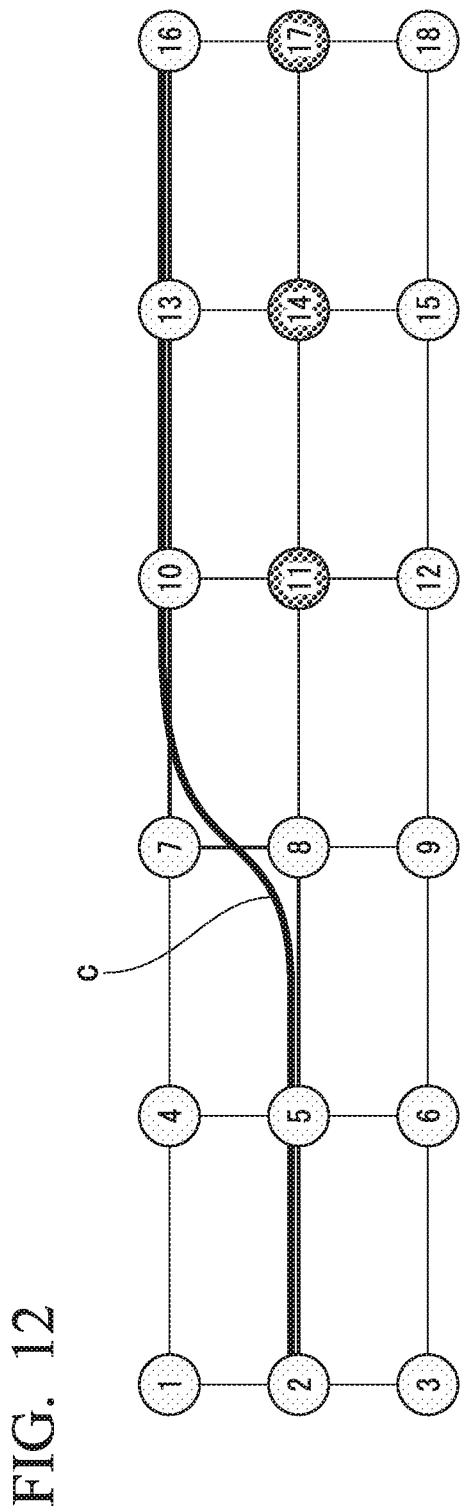
FIG. 12 is a view illustrating an example of a curve C generated based on the route.

If the route is determined by the evaluation unit 123C, the action plan generation unit 123 generates a smooth curve which approaches each of the nodes ND on the determined route and is indicated by a spline function or the like. Then, the action plan generation unit 123 sets the above-described course points on the curve. Accordingly, course determination is generated based on route analysis. FIG. 12 is a view illustrating an example of a curve C generated based on the route. The "curve" may include a straight line part.
(Calculation of NG Zone)

Figure 13:
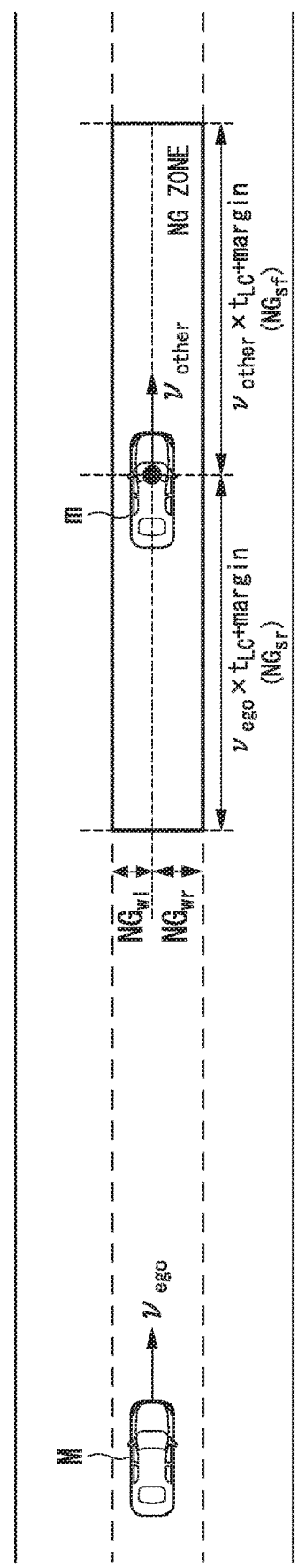
FIG. 13 is a view for describing a technique of setting an NG zone related to a forward moving direction.

Here, a technique of setting an NG zone will be described. FIG. 13 is a view for describing the technique of setting an NG zone related to the forward moving direction S. In the description below, a speed of the host vehicle is $v_{ego}$, a speed of the peripheral vehicle m is $v_{other}$, a margin distance is margin, and a first predetermined time is $t_{LC}$. For example, it is preferable that a value close to the length of the host vehicle M in a front-rear direction be set as the margin distance margin. It is preferable that a value of approximately two seconds be set as the first predetermined time $t_{LC}$.

For example, the evaluation unit 123C calculates a length $NG_{sf}$ of the NG zone on a side ahead of the peripheral vehicle m based on Expression (1) and calculates a length $NG_{sr}$ of the NG zone on a side behind the peripheral vehicle m based on Expression (2). Here, a speed of the host vehicle in the forward moving direction is $v_{xego}$, and a speed of the peripheral vehicle m in the forward moving direction is $v_{xother}$.

$$NG_{sf}=v_{xother} \times t_{LC}+\text{margin} \tag{1}$$

$$NG_{sr}=v_{xego} \times t_{LC}+\text{margin} \tag{2}$$

Figure 14:
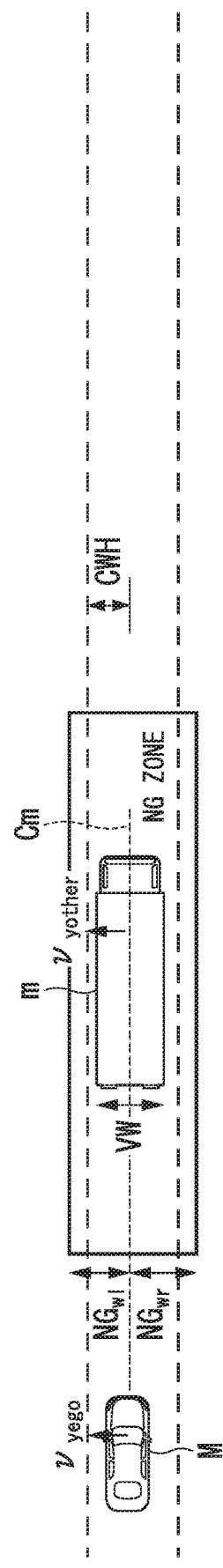
FIG. 14 is a view for describing the technique of setting an NG zone related to a road width direction (phase 1).

FIG. 14 is a view for describing the technique of setting an NG zone related to the road width direction W (phase 1). Here, a speed of the host vehicle M in the road width direction is $V_{yego}$, a speed of the peripheral vehicle m in the road width direction is $v_{yother}$, a vehicle width of the peripheral vehicle m is VW, a second predetermined time is $t_w$, half the length of a lane width is CWH, and a front-rear directional axis of the peripheral vehicle m is Cm.
((Case in which Host Vehicle and Peripheral Vehicle are in the Same Lane))

Figure 15:
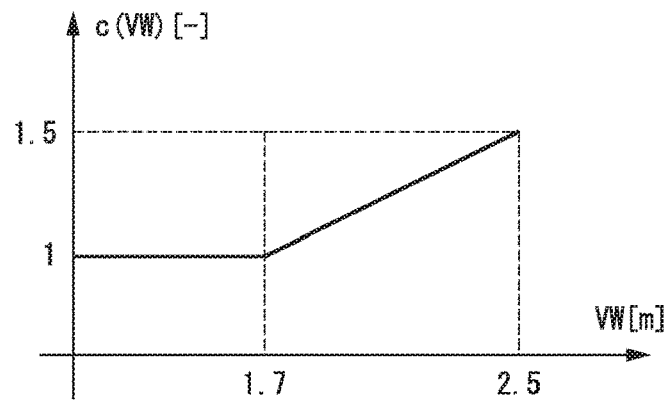
FIG. 15 is a view illustrating an example of a function c(VW).

(a) First, a case in which the speed of the peripheral vehicle m in the road width direction is zero (or smaller than a criterion) will be described. In this case, for example, the evaluation unit 123C calculates a width $NG_{wl}$ of the NG zone on the left side seen from the front-rear directional axis Cm of the peripheral vehicle m based on Expression (3) and calculates a width $NG_{wr}$ of the NG zone on the right side seen from the front-rear directional axis Cm of the peripheral vehicle m based on Expression (4). For example, a constant value const matches half the length CWH of the lane width. A function c(VW) indicates a tendency having the vehicle width VW of the peripheral vehicle m as a parameter and increasing when the vehicle width (VW) increases. FIG. 15 is a view illustrating an example of the function c(VW). As illustrated, the function c(VW) indicates a constant value when the vehicle width VW is less than the threshold value (for example, 1.7 m). The function c(VW) has a tendency gradually increasing when the vehicle width VW exceeds the threshold value.

$$NG_{wl}=c(VW) \cdot \text{const} \tag{3}$$

$$NG_{wr}=c(VW) \cdot \text{const} \tag{4}$$

The function c(VW) having a tendency increasing in accordance with an increase of the vehicle width VW of the peripheral vehicle m. Therefore, the evaluation unit 123C increases a cost to be applied to an edge on the periphery of the peripheral vehicle m when the peripheral vehicle m is large in size.

Figure 16:
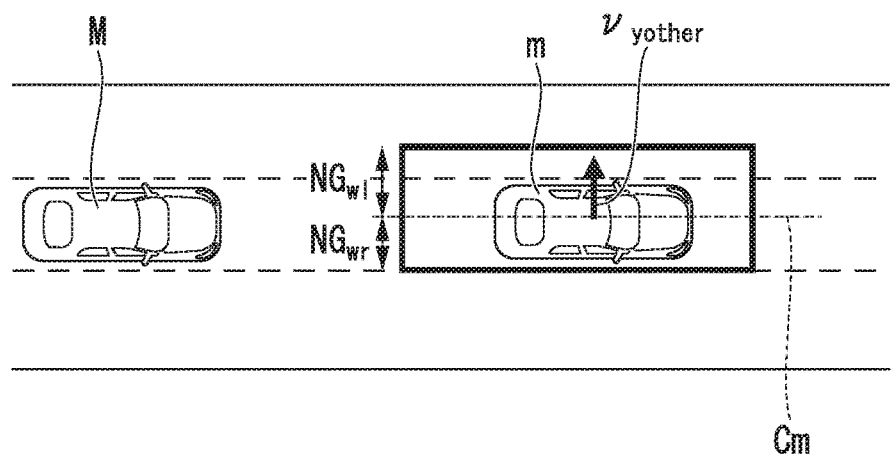
FIG. 16 is a view for describing the technique of setting an NG zone related to the road width direction (phase 2).

(b) Next, a case in which the speed of the peripheral vehicle m in the road width direction is not zero (or greater than the criterion) will be described. In description of this paragraph, a case which will be described in the next paragraph is omitted. FIG. 16 is a view for describing the technique of setting an NG zone related to the road width direction W (phase 2). In this case, for example, the evaluation unit 123C calculates the width $NG_{wl}$ of the NG zone on the left side seen from the front-rear directional axis Cm of the peripheral vehicle m based on Expression (5) and calculates the width $NG_{wr}$ of the NG zone on the right side seen from the front-rear directional axis Cm of the peripheral vehicle m based on Expression (6). That is, the evaluation unit 123C may set the width $NG_{wl}$ of the NG zone on a side to which the speed of the peripheral vehicle m in the road width direction is caused, to be greater than the width $NG_{wr}$ of the NG zone on the opposite side.

$$NG_{wl}=c(VW) \cdot \max(|v_{yother}| \times t_w, \text{const}) \tag{5}$$

$$NG_{wr}=c(VW) \cdot \text{const} \tag{6}$$

Figure 17:
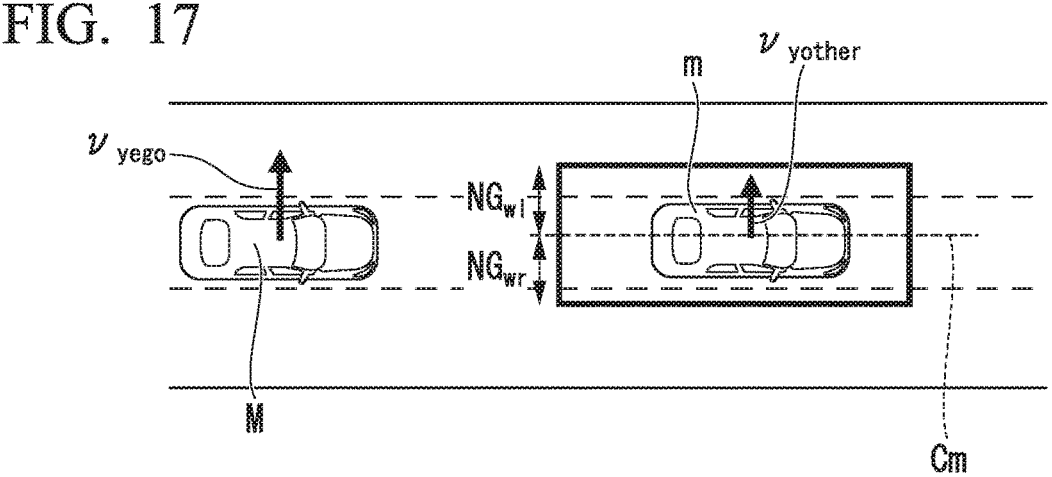
FIG. 17 is a view for describing the technique of setting an NG zone related to the road width direction (phase 3).

(c) Next, a case in which the speed of the host vehicle M in the road width direction is not zero (or greater than the criterion), the speed of the peripheral vehicle m in the road width direction is not zero (or greater than the criterion), and the speeds are caused in the same direction will be described. Excluding the case described above, other cases may be classified into any of (a) and (b). FIG. 17 is a view for describing the technique of setting an NG zone related to the road width direction W (phase 3). In this case, for example, the evaluation unit 123C calculates the width $NG_{wl}$ of the NG zone on the left side seen from the front-rear directional axis Cm of the peripheral vehicle m based on Expression (7) and calculates the width $NG_{wr}$ of the NG zone on the right side seen from the front-rear directional axis Cm of the peripheral vehicle m based on Expression (8). That is, the evaluation unit 123C may determine the width $NG_{wl}$ of the NG zone on a side to which the speed of the peripheral vehicle m in the road width direction is caused, based on the speed $v_{yother}$ and may determine the width $NG_{wr}$ of the NG zone on the opposite side based on the speed $v_{yego}$.

$$NG_{wl}=c(VW) \cdot \max(|v_{yother}| \times t_w, \text{const}) \tag{7}$$

$$NG_{wr}=c(VW) \cdot \max(|v_{yego}| \times t_w, \text{const}) \tag{8}$$

Expressions (3) to (8) are established on the premise of a case in which the host vehicle M and the peripheral vehicle m are in the same lane, that is, a case in which a position $y_{ego}$ of the host vehicle M in the road width direction≈a position $y_{other}$ of the peripheral vehicle m in the road width direction. In addition to thereof, when the host vehicle M and the peripheral vehicle m are in different lanes, that is, when $y_{ego} \neq y_{other}$, the evaluation unit 123C may perform a calculation different from those based on Expressions (3) to (8).
((Case in which Host Vehicle and Peripheral Vehicle are in Different Lanes))

In this case, (A) when the speeds of both the host vehicle M and the peripheral vehicle m in the road width direction are zero (or smaller than the criterion), and (B) when one or both the host vehicle M and the peripheral vehicle m have speeds in the road width direction but the speeds are in directions separated from each other, the evaluation unit 123C may set $NG_{wl}=NG_{wr}=c(VW) \cdot const$ without particularly considering the speed in the road width direction.

(C) Therefore, when the host vehicle M and the peripheral vehicle m are in different lanes, the evaluation unit 123C sets the width $NG_{wl}$ and $NG_{wr}$ of the NG zone as follows when any one or both of the host vehicle M and the peripheral vehicle m have speeds in the road width direction and the speeds are in a direction in which the host vehicle M and the peripheral vehicle m approach each other.

Figure 18:
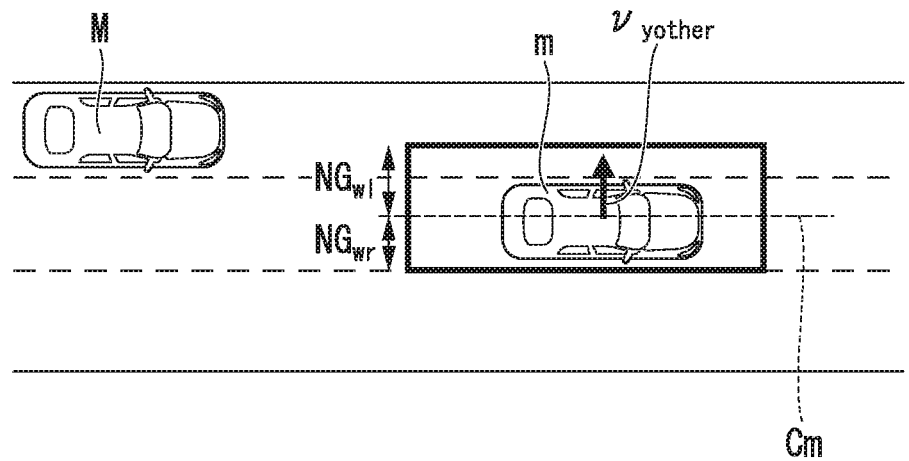
FIG. 18 is a view for describing the technique of setting an NG zone related to the road width direction (phase 4).

FIG. 18 is a view for describing the technique of setting an NG zone related to the road width direction W (phase 4). The illustrated example is an example of a case in which the speed $v_{yego}$ of the host vehicle M in the road width direction=is zero and the speed $Vy_{other}$ of the peripheral vehicle m in the road width direction has magnitude and is caused in a direction toward the traveling lane of the host vehicle M, when the host vehicle M and the peripheral vehicle m are in different lanes. In this case, for example, based on Expressions (9) and (10), the evaluation unit 123C calculates the widths $NG_{wl}$ and $NG_{wr}$ of the NG zone and sets the width $NG_{wl}$ to be relatively significant compared to $c(VW) \cdot const$.

$$NG_{wl}=c(VW) \cdot \max(|v_{y_{other}}| \times t_w, const) \quad (9)$$

$$NG_{wr}=c(VW) \cdot const \quad (10)$$

Figure 19:
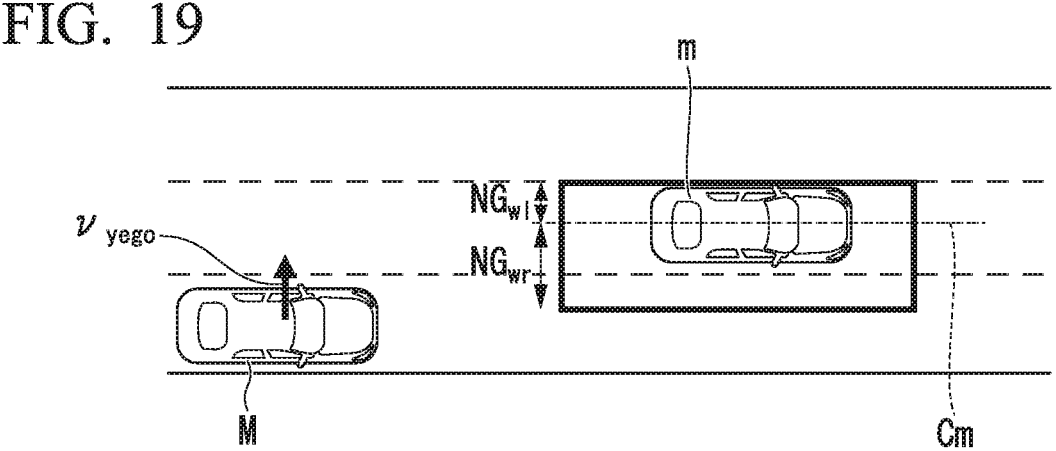
FIG. 19 is a view for describing the technique of setting an NG zone related to the road width direction (phase 5).

FIG. 19 is a view for describing the technique of setting an NG zone related to the road width direction W (phase 5). The illustrated example is an example of a case in which the speed $Vy_{other}$ of the peripheral vehicle m in the road width direction=zero and the speed $v_{yego}$ of the host vehicle M in the road width direction has magnitude and is caused in a direction toward the traveling lane of the peripheral vehicle m, when the host vehicle M and the peripheral vehicle m are in different lanes. In this case, for example, based on Expressions (11) and (12), the evaluation unit 123C calculates the widths $NG_{wl}$ and $NG_{wr}$ of the NG zone and sets the width $NG_{wr}$ to be relatively significant compared to $c(VW) \cdot const$.

$$NG_{wl}=c(VW) \cdot const \quad (11)$$

$$NG_{wr}=c(VW) \cdot \max(|v_{yego}| \times t_w, const) \quad (12)$$

Figure 20:
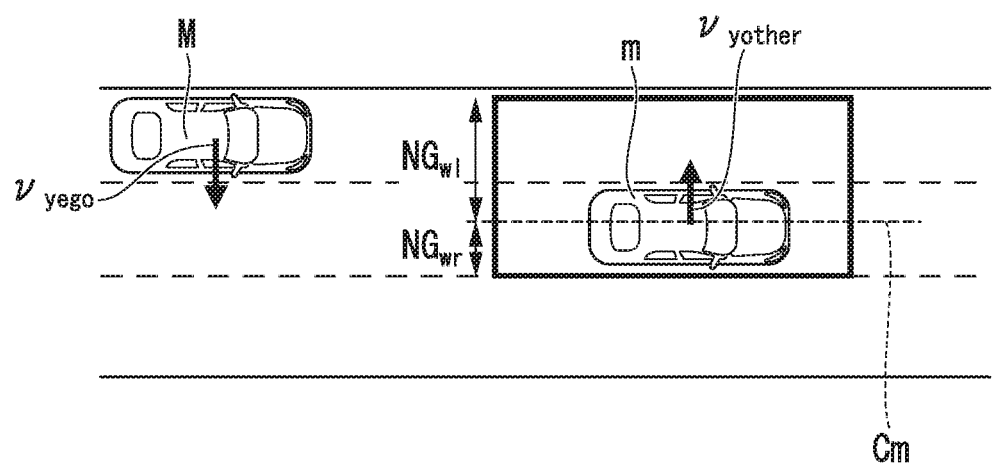
FIG. 20 is a view for describing the technique of setting an NG zone related to the road width direction (phase 6).

FIG. 20 is a view for describing the technique of setting an NG zone related to the road width direction W (phase 6). The illustrated example is an example of a case in which the speed $Vy_{other}$ of the peripheral vehicle m in the road width direction and the speed $v_{yego}$ of the host vehicle M in the road width direction have magnitude and are caused in a direction in which the host vehicle M and the peripheral vehicle m approach each other, when the host vehicle M and the peripheral vehicle m are in different lanes. In this case, for example, based on Expressions (13) and (14), the evaluation unit 123C calculates the widths $NG_{wl}$ and $NG_{wr}$ of the NG zone and sets the width $NG_{wl}$ to be relatively significant compared to $c(VW) \cdot const$.

$$NG_{wl}=c(VW) \cdot \max(|v_{yego}| \times t_w, const) \quad (13)$$

$$NG_{wr}=c(VW) \cdot const \quad (14)$$

From the relationships of Expressions (1) to (14), it is understood that the relationship between the length $NG_{sf}$ of the NG zone and the widths $NG_{wl}$ and $NG_{wr}$ of the NG zone depends on an inclination ($v_{yother}/v_{xother}$) of the direction of the peripheral vehicle m with respect to a road. Therefore, the evaluation unit 123C sets the NG zone based on an inclination of the direction of the peripheral vehicle m with respect to a road, thereby determining the cost.

The NG zone is also applied to the peripheral vehicle m present behind the host vehicle M. That is, when the peripheral vehicle m approaches from behind at a speed higher than that of the host vehicle M, the host vehicle M is controlled to make a lane change or to accelerate such that the host vehicle M is not caught up in the NG zone on a side ahead of the peripheral vehicle m.

According to the processing, it is possible to set an NG zone based on a motion along the road width direction W of the peripheral vehicle m, to set a high cost in regard to a location to which the peripheral vehicle m may make a lane change, and to determine a route in a direction not traveling therein.

(Revision of Cost and Position of Node in Accordance with Positional Bias of Peripheral Vehicle)

Figure 21:
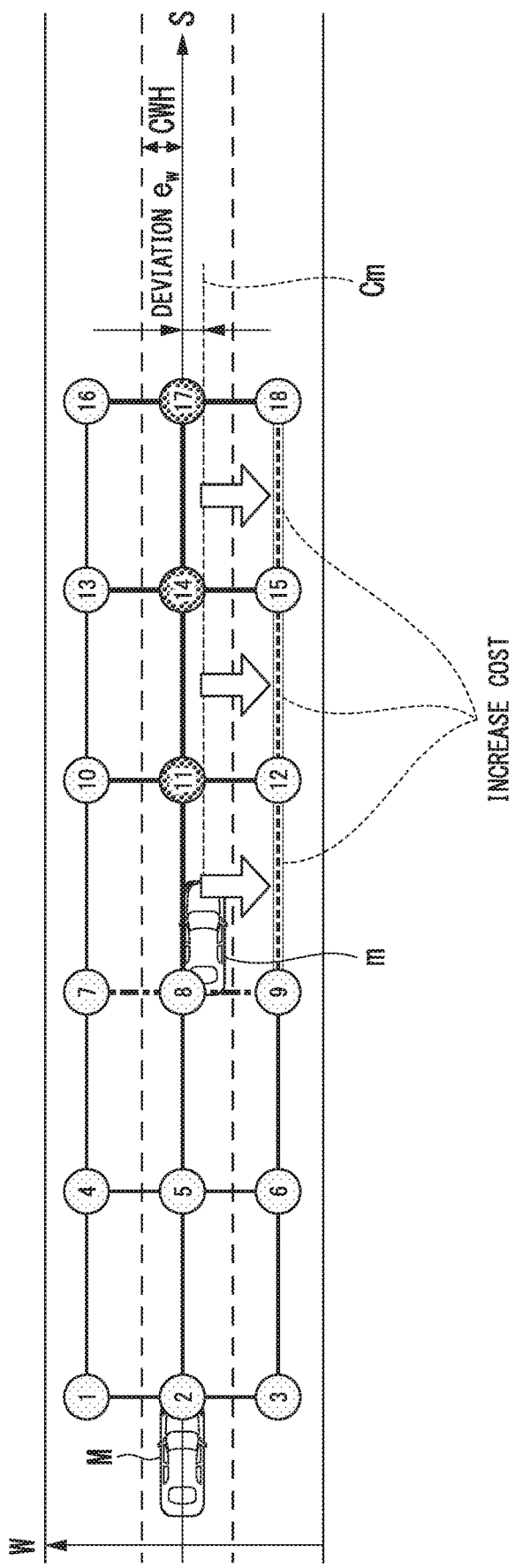
FIG. 21 is a view for describing a revision of costs in accordance with a positional bias of a peripheral vehicle.

FIG. 21 is a view for describing a revision of costs in accordance with a positional bias of a peripheral vehicle. As illustrated, when the front-rear directional axis Cm of the peripheral vehicle m is estranged from the central line of a lane and a deviation $e_w$ is caused, the evaluation unit 123C revises the cost in an increment direction using a value based on the deviation $e_w$, with respect to the edges ED (in the drawings, the edges (9, 12), (12, 15), and (15, 18)) on a lane on a side to which the peripheral vehicle m leans. For example, the evaluation unit 123C revises the cost with respect to the corresponding edges ED by adding a correction value β indicated in Expression (15). In Expression, γ is an arbitrary coefficient.

$$\beta = \gamma \times e_w/CWH \quad (15)$$

According to the processing, it is possible to set a high cost in regard to a part in a cramped state due to the peripheral vehicle m which has leaned thereto, and to determine a route in a direction not traveling therein.

Figure 22:
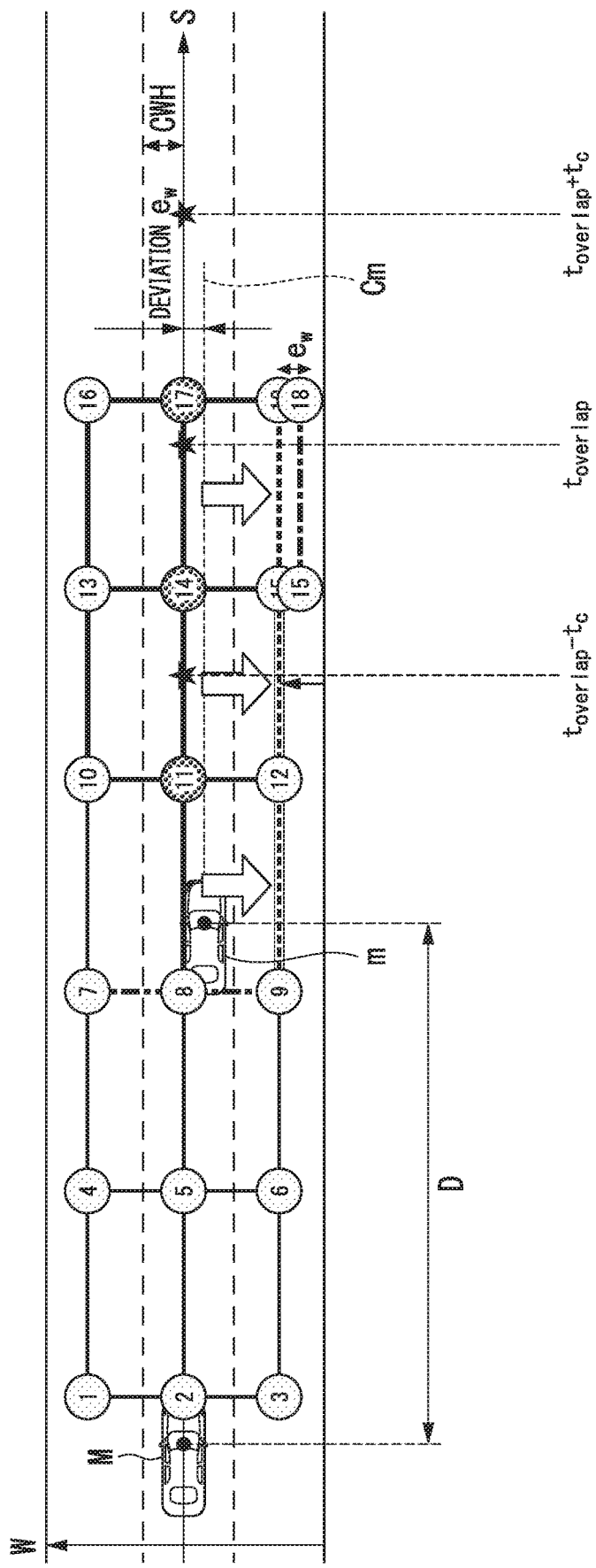
FIG. 22 is a view for describing a revision of positions of nodes in accordance with the positional bias of the peripheral vehicle.

FIG. 22 is a view for describing a revision of positions of nodes in accordance with the positional bias of the peripheral vehicle. As illustrated, when the front-rear directional axis Cm of the peripheral vehicle m is estranged from the central line of the lane and the deviation $e_w$ is caused, and when the node ND on a lane on a side to which the peripheral vehicle m leans satisfies the condition indicated in Expression (16), the edge postulation unit 123A moves the position of the node ND to the same side as the deviation $e_w$, for example, by the same amount as the deviation $e_w$. The value $t_c$ in Expression is a predetermined value, and a catch-up time $t_{overlap}$ is calculated by Expression (17). In Expression, D is a distance between the representative point of the host vehicle M and the representative point of the peripheral vehicle m, and c is a very small value for preventing division by zero. The node ND satisfying Expression (16) is a node ND having a relationship in which the host vehicle M and the peripheral vehicle m approach each other equal to or closer than a predetermined distance at timing when the host vehicle M arrives at the position thereof.

$$t_{overlap}-t_c \leq (\text{arrival time for host vehicle } M \text{ to node})$$
$$\leq t_{overlap}+t_c \quad (16)$$

$$t_{overlap}=D/\{\max(|v_{xego}-v_{xother}|, \varepsilon)\} \quad (17)$$

(Processing Flow)

Figure 23:
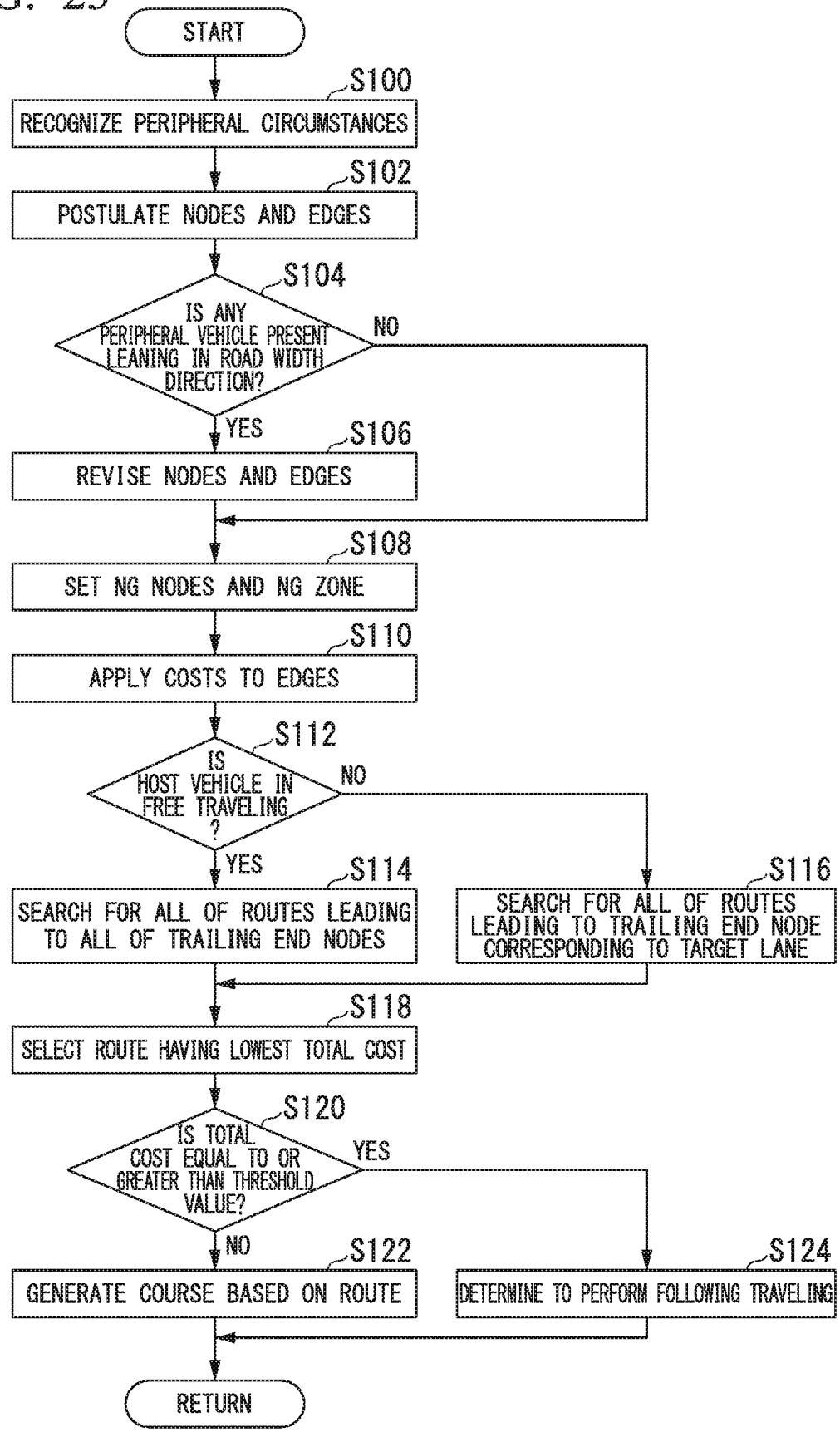
FIG. 23 is a flowchart illustrating an example of a flow of processing executed by an automated drive control unit.

FIG. 23 is a flowchart illustrating an example of a flow of processing executed by the automated drive control unit 100. First, the exterior recognition unit 121 or the host vehicle position recognition unit 122 recognizes peripheral circumstances of the host vehicle M (Step S100).

Next, the edge postulation unit 123A postulates nodes ND and edges ED in the target section A1 (Step S102). Next, the edge postulation unit 123A determines whether or not any peripheral vehicle m leaning in the road width direction W is present (Step S104). When a peripheral vehicle m is present, the edge postulation unit 123A revises the nodes ND and the edges ED (Step S106).

Next, the evaluation unit 123C sets NG nodes and an NG zone (Step S108) and applies costs to the edges ED (Step S110).

Next, the evaluation unit 123C determines whether or not the host vehicle M is in free traveling (Step S112). When the host vehicle M is in free traveling, the evaluation unit 123C searches for all of the routes leading to all of the trailing end nodes (Step S114). When not in free traveling, the evaluation unit 123C searches for all of the routes leading to the trailing end node corresponding to an target lane (Step S116). The evaluation unit 123C selects a route having the lowest total cost (Step S118) and determines whether or not the total cost of the selected route is equal to or greater than the threshold value (Step S120). When the total cost of the selected route is less than the threshold value, the action plan generation unit 123 generates a course based on the route selected in Step S118 (Step S122). Meanwhile, when the total cost of the selected route is equal to or greater than the threshold value, the action plan generation unit 123 determines to perform following traveling (Step S124).

(Simulation Result)

The inventor of this application has performed a simulation in which the functions of the embodiment described above are reproduced in a computer. The simulation result is as follows.

Figure 24:
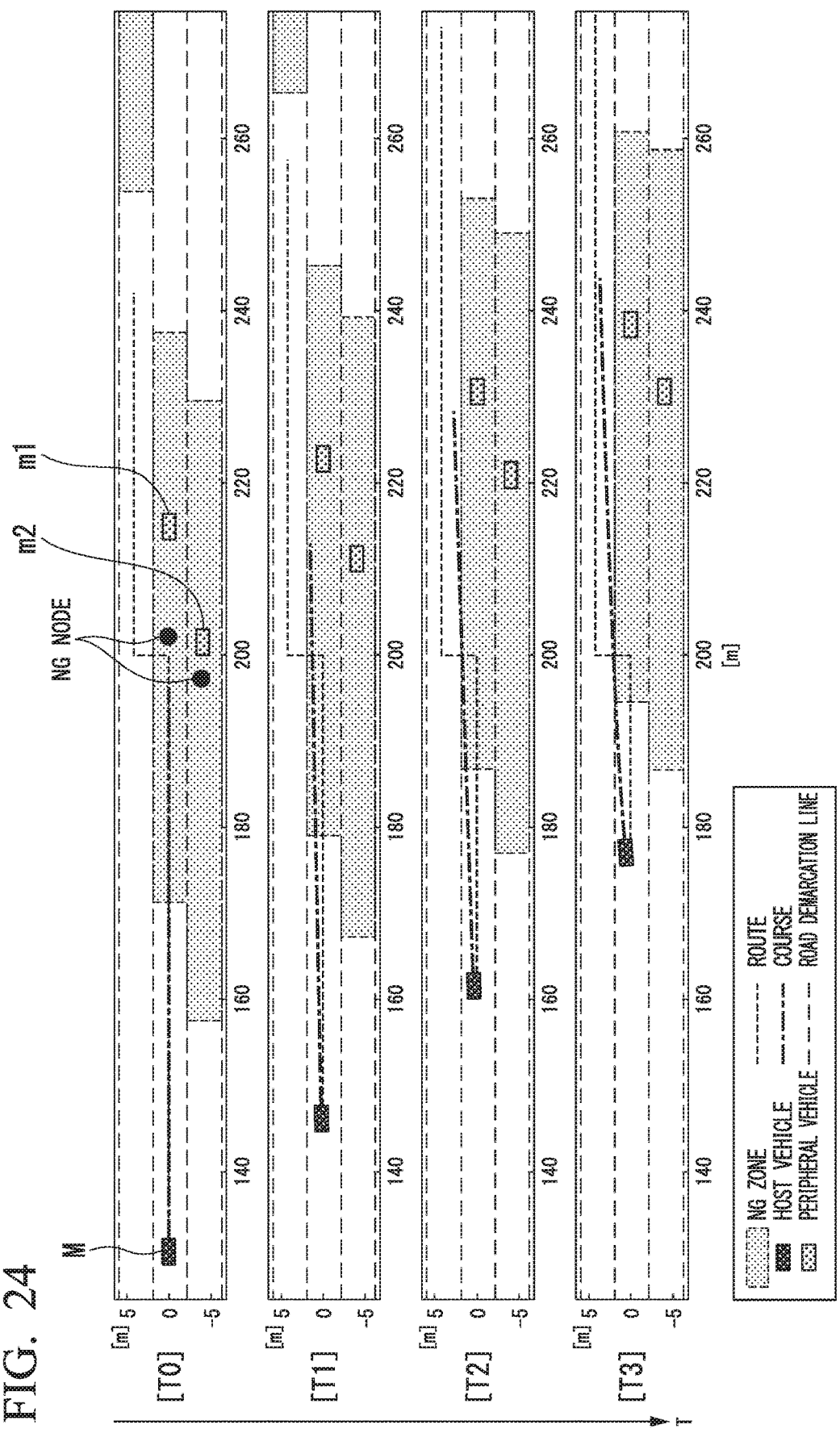
FIG. 24 is a view illustrating a state in which the host vehicle makes a lane change to pass a peripheral vehicle ahead (phase 1).
Figure 25:
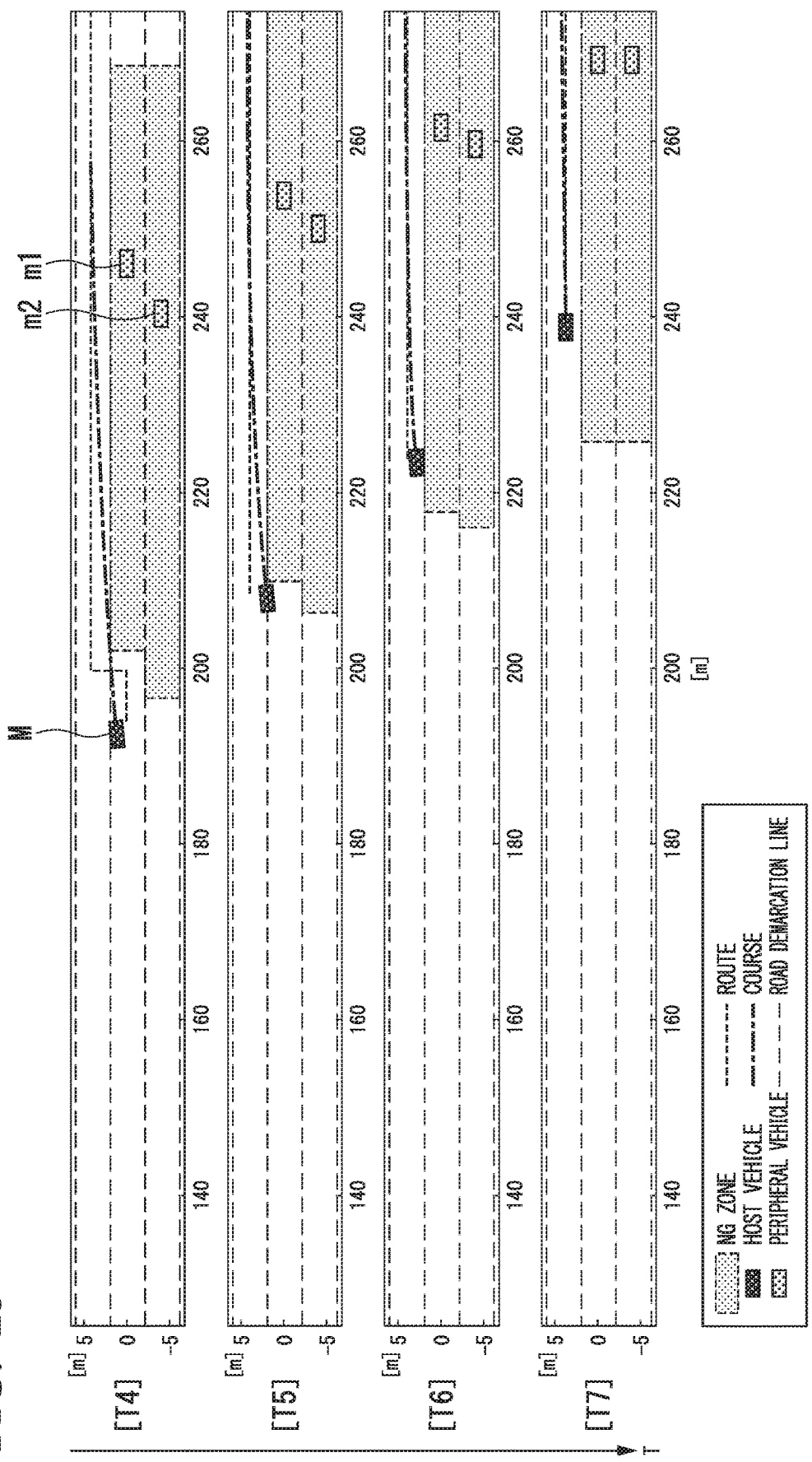
FIG. 25 is a view illustrating a state in which the host vehicle makes a lane change to pass the peripheral vehicle ahead (phase 2).

FIGS. 24 and 25 are views illustrating a state in which the host vehicle M makes a lane change to pass the peripheral vehicle m ahead. At a time T0, a peripheral vehicle m1 is present in the same lane and a peripheral vehicle m2 is present in a lane on the right side ahead of the host vehicle M. Since the speeds of the peripheral vehicles m1 and m2 are lower than the speed of the host vehicle M, the NG nodes are set at places the host vehicle M is estimated to approach. As a result, the evaluation unit 123C determines that a route of making a lane change to the left side has the lowest total cost and generates a route as illustrated. The traveling control unit 141 generates a course based on the generated route. As a result, the host vehicle M starts to turn to the left at around times T2 to T3 and completes a lane change to the lane on the left side at a time T6. Consequently, the host vehicle M can pass the peripheral vehicles m1 and m2 ahead by traveling straight forward without any change.

Figure 26:
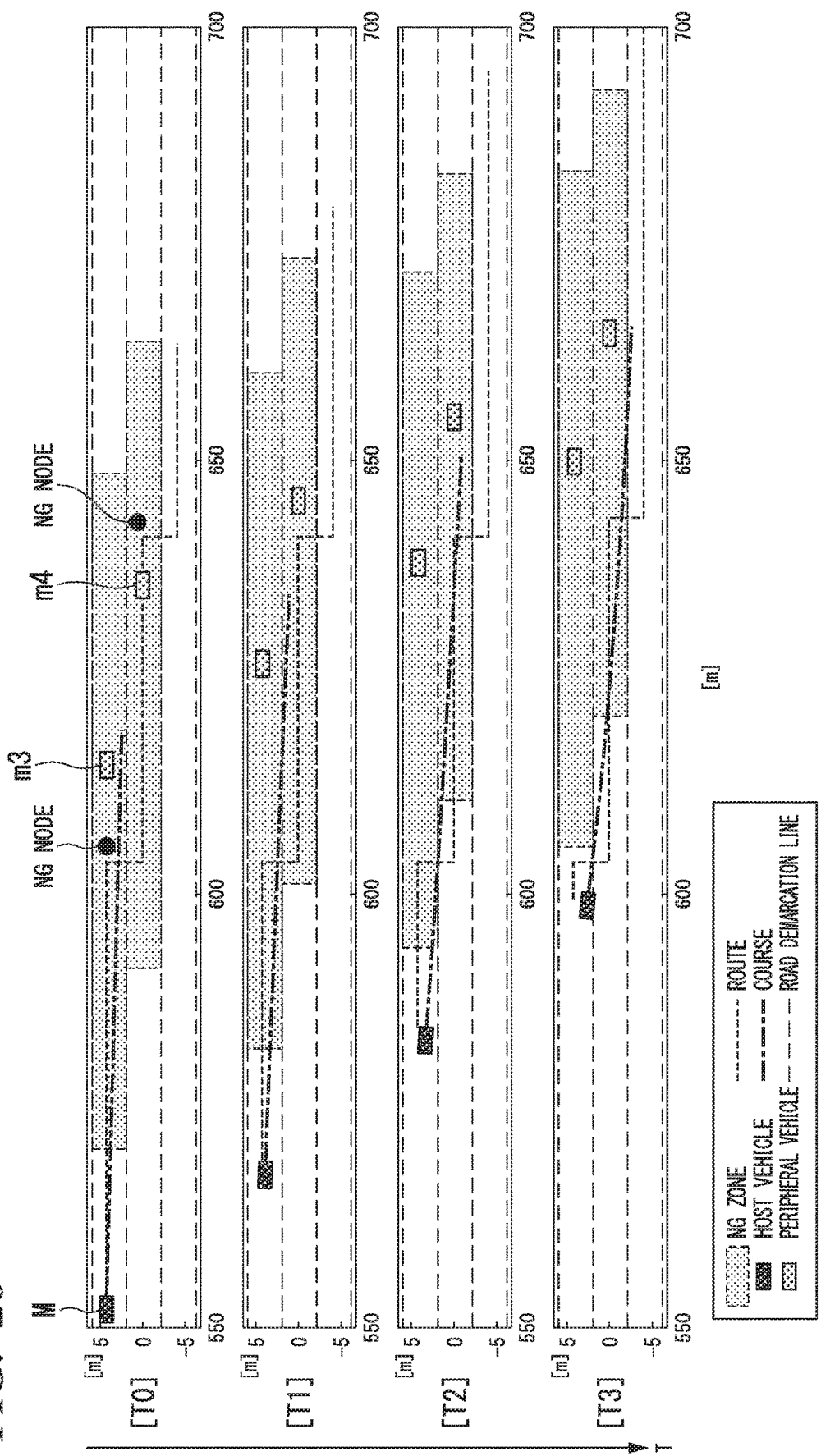
FIG. 26 is a view illustrating a state in which the host vehicle makes two lane changes to pass a peripheral vehicle ahead (phase 1).
Figure 27:
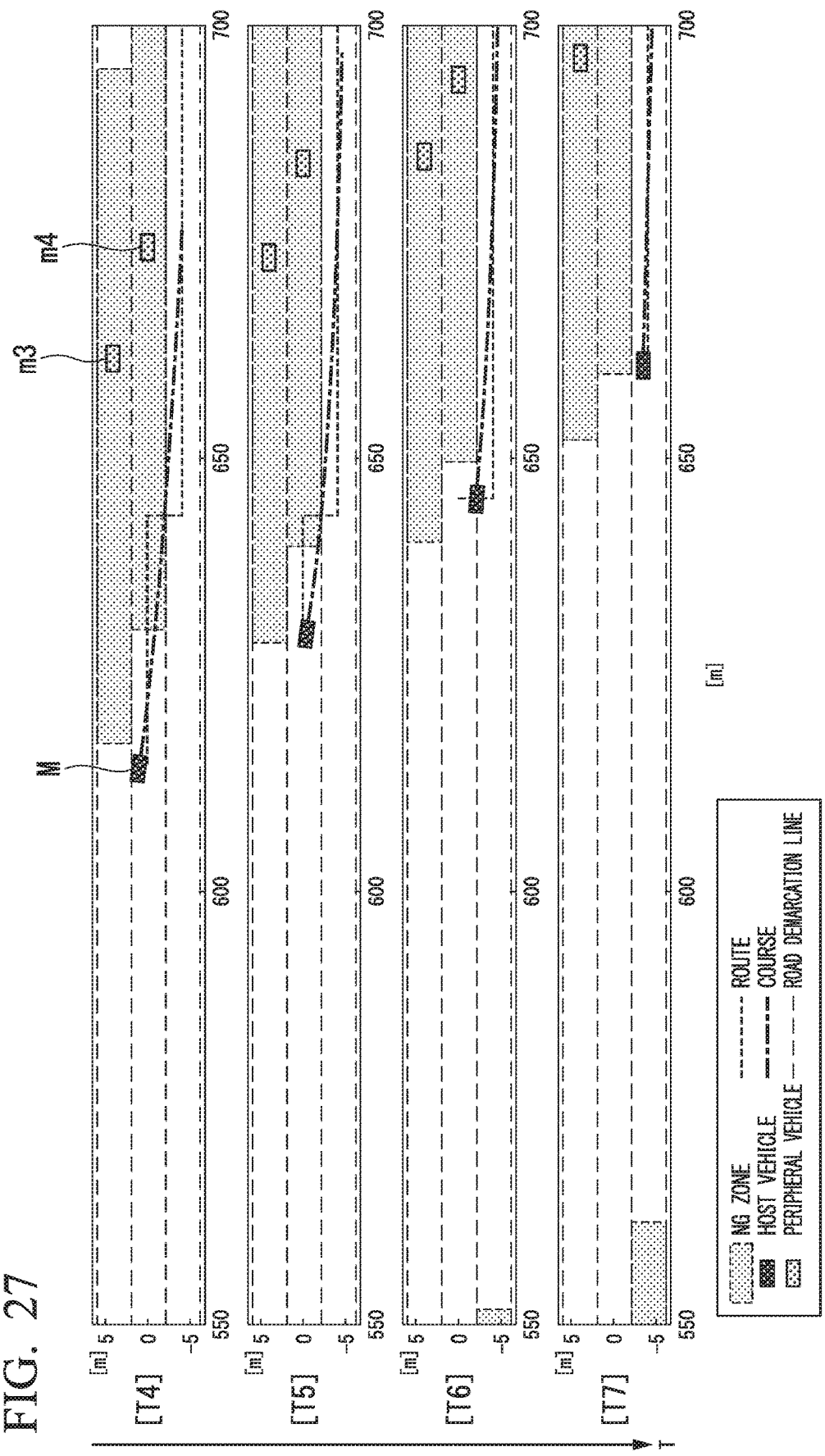
FIG. 27 is a view illustrating a state in which the host vehicle makes two lane changes to pass the peripheral vehicle ahead (phase 2).

FIGS. 26 and 27 are views illustrating a state in which the host vehicle M makes two lane changes to pass the peripheral vehicle m ahead. At the time T0, a peripheral vehicle m3 is present in the same lane and a peripheral vehicle m4 is present in the middle lane ahead of the host vehicle M traveling the lane on the left side. Since the speeds of the peripheral vehicles m3 and m4 are lower than the speed of the host vehicle M, the NG nodes are set at places the host vehicle M is estimated to approach. As a result, the evaluation unit 123C causes the host vehicle M to make a lane change to the middle lane. Subsequently, the evaluation unit 123C determines that a route of making a lane change to the lane on the right side has the lowest total cost and generates a route as illustrated. The traveling control unit 141 generates a course based on the generated route. As a result, the host vehicle M starts to turn to the right at around the time T1 and completes a lane change to the middle lane at the time T4. Moreover, the host vehicle M continues to turn to the right and completes a lane change to the lane on the right side at the time T7. The host vehicle M can pass the peripheral vehicles m3 and m4 ahead by traveling straight forward without any change.

Figure 28:
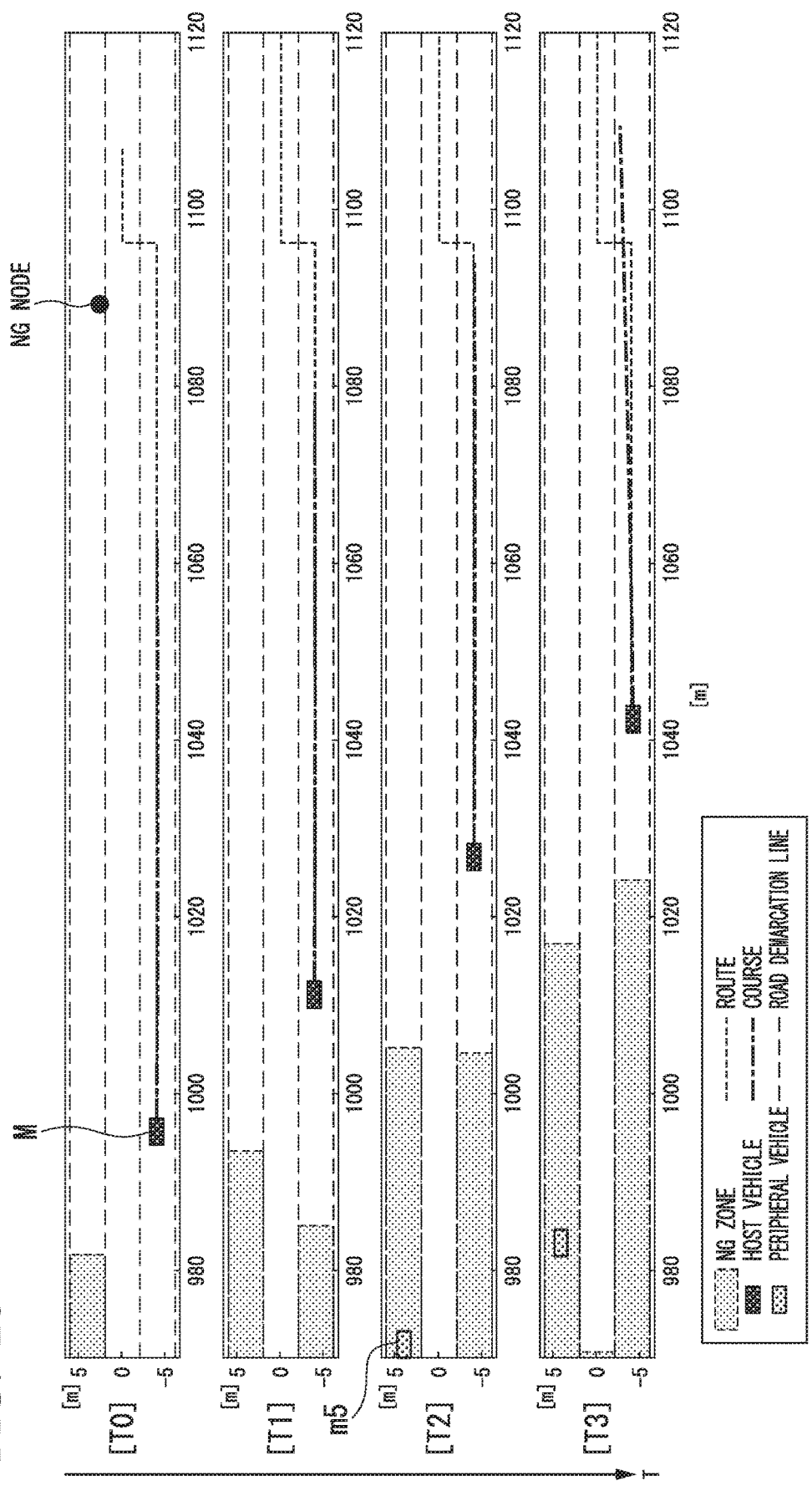
FIG. 28 is a view illustrating a state in which the host vehicle clears the way for a peripheral vehicle approaching from behind (phase 1).
Figure 29:
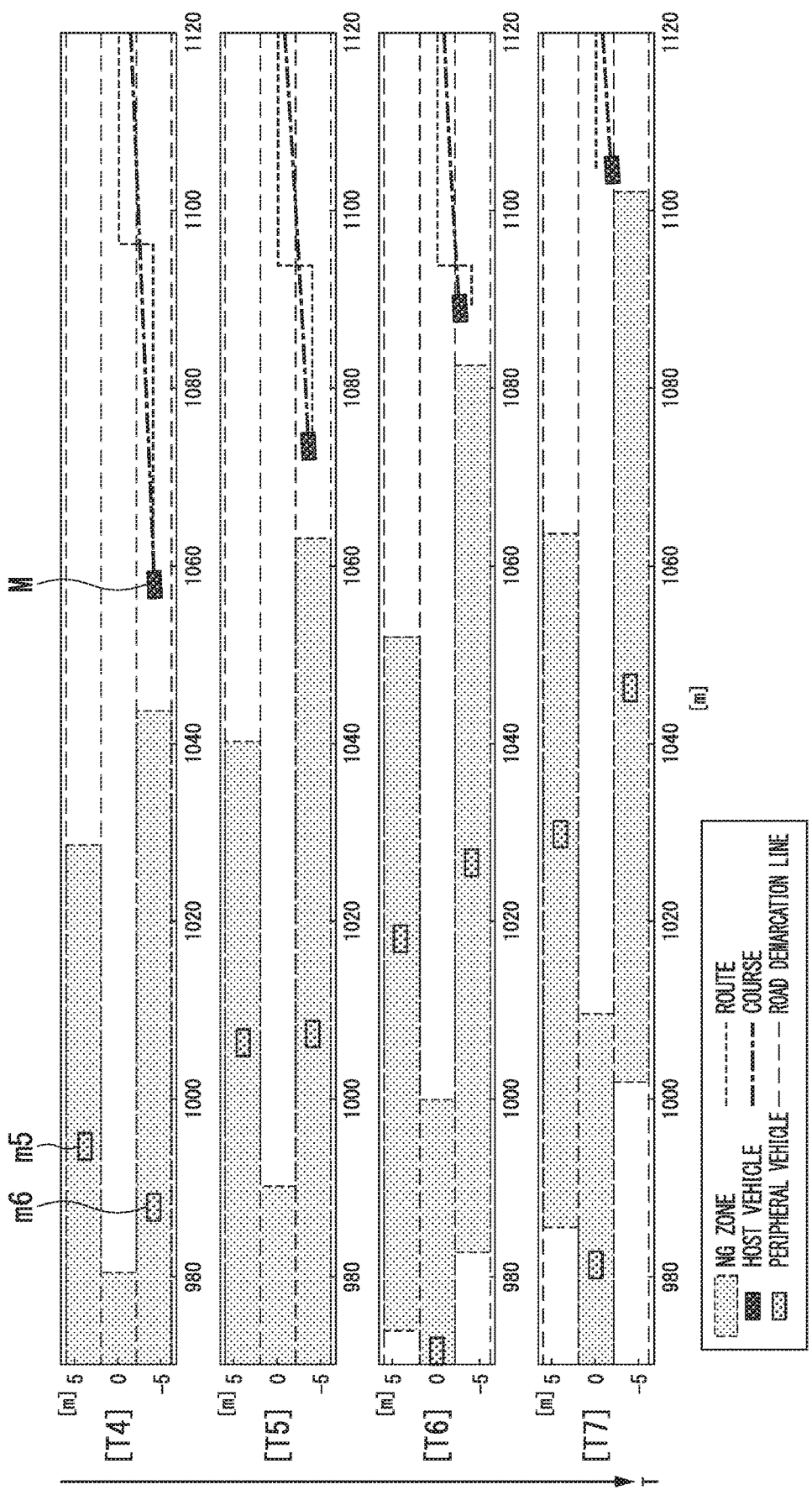
FIG. 29 is a view illustrating a state in which the host vehicle clears the way for the peripheral vehicle approaching from behind (phase 2).

FIGS. 28 and 29 are views illustrating a state in which the host vehicle M clears the way for the peripheral vehicle m approaching from behind. At the time T0, a peripheral vehicle m6 is present in the same lane and a peripheral vehicle m5 is present in the lane on the left side (in the drawings, the peripheral vehicle m5 is not shown but is assumed to be recognized by the exterior recognition unit 121) behind the host vehicle M traveling the lane on the right side. Since the speed of the peripheral vehicle m6 is higher than the speed of the host vehicle M, the NG node is set at a place the peripheral vehicle m6 is estimated to catch up the host vehicle M. As a result, the evaluation unit 123C determines that a route of making a lane change to the middle lane has the lowest total cost and generates a route as illustrated. The traveling control unit 141 generates a course based on the generated route. As a result, the host vehicle M starts to turn to the left at around the time T4 and completes a lane change to the middle lane at the time T7. As a result, the peripheral vehicle m6 can pass the host vehicle M ahead by traveling straight forward without any change.

According to the vehicle system 1 (route determination device) of the embodiment, it is possible to determine a route more quickly and appropriately by recognizing peripheral circumstances of the host vehicle M and evaluating the route generated by joining the edges connecting the virtual nodes which are located with space in each of the forward moving direction and the road width direction on a side in the forward moving direction of the host vehicle M, based on the sum of costs applied to the edges based on peripheral circumstances of the host vehicle.

Figure 30:
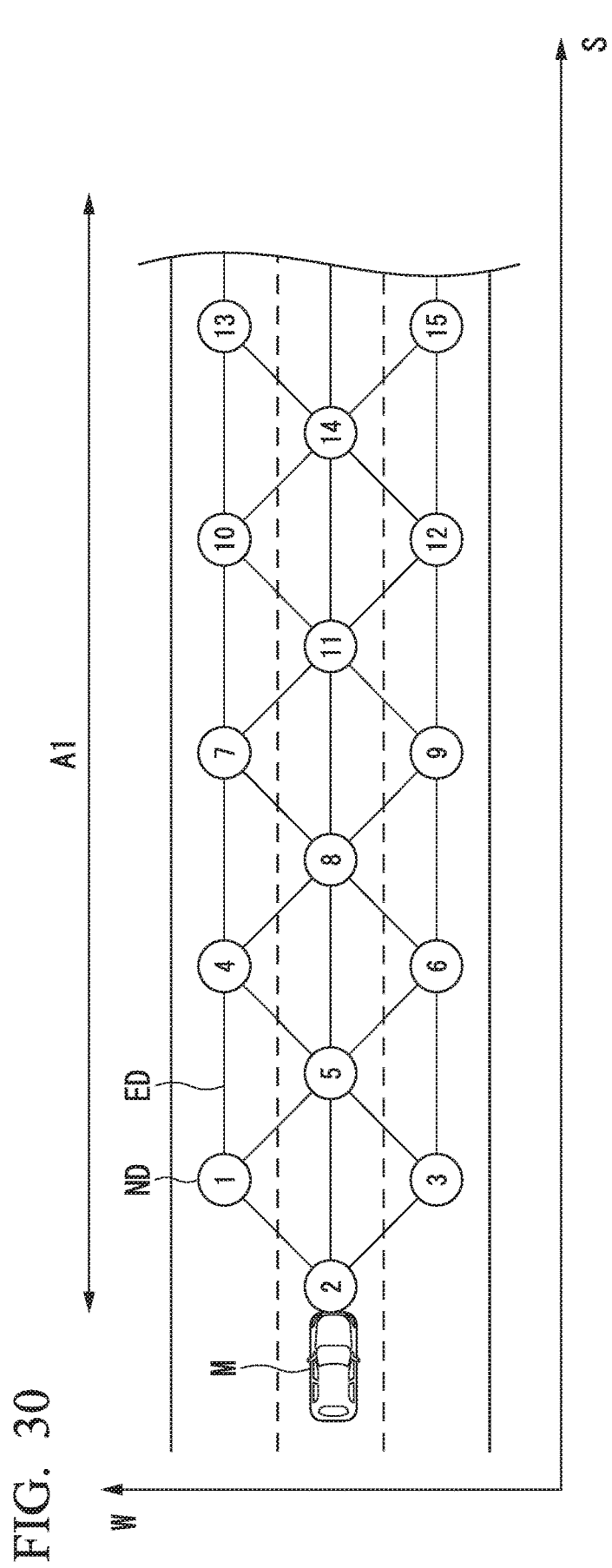
FIG. 30 is a view illustrating another example of an arrangement of nodes.

As illustrated in FIG. 4, the embodiment has been described with the example in which the nodes ND are located in a grid shape. However, the embodiment is not limited thereto. The node ND need only be located with space in each of the forward moving direction and the road width direction, and may be located in any arrangement. FIG. 30 is a view illustrating another example of an arrangement of the nodes ND and the edges ED.

Hereinabove, a form of executing the present invention has been described using the embodiment. However, the present invention is not limited to such an embodiment in any events, and various changes and replacements may be added within a range not departing from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A route determination device comprising a processor configured to:
   recognize peripheral circumstances of a host vehicle;
   evaluate each of a plurality of routes based on a sum of costs respectively applied to a plurality of edges based on the peripheral circumstances of the host vehicle;

select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predetermined distance from adjacent virtual nodes of the plurality of virtual nodes in each of a forward moving direction and a road width direction;

recognize a position of an object on a periphery of the host vehicle; and increase a cost to be applied to an edge corresponding to another lane on a side toward which the object is biased, in a case that the position of the object recognized by the recognition unit is biased from a center of a lane, for evaluating each of a plurality of routes.

2. The route determination device according to claim 1, wherein the plurality of virtual nodes are located for each lane in the road width direction.

3. The route determination device according to claim 1, wherein the processor individually evaluates one or more routes in which the host vehicle is able to arrive at a target lane at a trailing end of an evaluation section in a case that the target lane at the trailing end of the evaluation section is set.

4. A vehicle control device comprising:
the route determination device according to claim 1; and
a driving control unit that controls the host vehicle to move based on a route selected by the evaluation unit of the route determination device.

5. A route determination device comprising a processor configured to:
recognize peripheral circumstances of a host vehicle;
evaluate each of a plurality of routes based on a sum of costs respectively applied to a plurality of edges based on the peripheral circumstances of the host vehicle;
select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predetermined distance from adjacent virtual nodes of the plurality of virtual nodes in each of a forward moving direction and a road width direction;
recognize a position and a state of an object on a periphery of the host vehicle,
estimate a future position of the object based on the position and the state of the object; and
apply a cost to each of the plurality of edges based on the future position of the object for evaluating each of a plurality of routes.

6. The route determination device according to claim 5, wherein the plurality of virtual nodes are located for each lane in the road width direction.

7. The route determination device according to claim 5, wherein the processor individually evaluates one or more routes in which the host vehicle is able to arrive at an a target lane at a trailing end of an evaluation section in a case that the target lane at the trailing end of the evaluation section is set.

8. A vehicle control device comprising:
the route determination device according to claim 5; and
a driving control unit that controls the host vehicle to move based on a route selected by the evaluation unit of the route determination device.

9. A route determination device comprising a processor configured to:
recognize peripheral circumstances of a host vehicle;
evaluate each of a plurality of routes based on a sum of costs respectively applied to a plurality of edges based on the peripheral circumstances of the host vehicle;
select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predetermined distance from adjacent virtual nodes of the plurality of virtual nodes in each of a forward moving direction and a road width direction; and
determine that the host vehicle is to follow a preceding vehicle in a case that a sum of the costs of all of the plurality of routes exceeds a criterion.

10. A vehicle control device comprising:
the route determination device according to claim 9; and
a driving control unit that controls the host vehicle to move based on a route selected by the evaluation unit of the route determination device.

11. A route determination device comprising a processor configured to:
recognize peripheral circumstances of a host vehicle;
evaluate each of a plurality of routes based on a sum of costs respectively applied to a plurality of edges based on the peripheral circumstances of the host vehicle;
select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predetermined distance from adjacent virtual nodes of the plurality of virtual nodes in each of a forward moving direction and a road width direction;
recognize a position and a size of an object on a periphery of the host vehicle; and
increase a cost to be applied to an edge on the periphery of the object in proportion to an increase in a width of the recognized object.

12. A vehicle control device comprising:
the route determination device according to claim 11; and
a driving control unit that controls the host vehicle to move based on a route selected by the evaluation unit of the route determination device.

13. A route determination device comprising a processor configured to:
recognize peripheral circumstances of a host vehicle;
evaluate each of a plurality of routes based on a sum of costs respectively applied to a plurality of edges based on the peripheral circumstances of the host vehicle;
select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predetermined distance from adjacent virtual nodes of the plurality of virtual nodes in each of a forward moving direction and a road width direction;

recognize a direction in which an object on a periphery of the host vehicle moves; and determine a cost to be applied to an edge on the periphery of the object, based on the direction.

14. A vehicle control device comprising:

the route determination device according to claim 13; and a driving control unit that controls the host vehicle to move based on a route selected by the evaluation unit of the route determination device.

15. A route determination method using a computer mounted in a host vehicle, comprising:

recognizing peripheral circumstances of the host vehicle;

evaluating each of a plurality of routes based on a sum of costs respectively applied to a plurality of edges based on the peripheral circumstances of the host vehicle; and selecting one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, virtual nodes of the plurality of virtual nodes being located a predefined distance from one another in each of a forward moving direction and a road width direction, wherein the recognizing includes recognizing a position and a state of an object on a periphery of the host vehicle, and the evaluating includes applying a cost to each of the plurality of edges based on the future position of the object for evaluating each of a plurality of routes.

16. A non-transitory computer-readable storage medium which stores a program for causing a computer mounted in a host vehicle:

to recognize peripheral circumstances of the host vehicle;

to evaluate each of a plurality of routes based on a sum of costs respectively applied to a plurality of edges based on the peripheral circumstances of the host vehicle; and to select one or more routes from the plurality of routes based on an evaluation result, each of the plurality of routes being generated by joining at least two edges of the plurality of edges, and each of the plurality of edges being generated by connecting two adjacent virtual nodes among a plurality of virtual nodes, the plurality of virtual nodes being located a predetermined distance from one another in each of a forward moving direction and a road width direction, wherein the recognition includes recognizing a position and a state of an object on a periphery of the host vehicle, and the evaluation includes applying a cost to each of the plurality of edges based on the future position of the object for evaluating each of a plurality of routes.

* * * * *